United States Patent
Maeda et al.

(10) Patent No.: US 10,766,806 B2
(45) Date of Patent: Sep. 8, 2020

(54) GLASS FOR DATA STORAGE MEDIUM SUBSTRATE, GLASS SUBSTRATE FOR DATA STORAGE MEDIUM, AND MAGNETIC DISK

(71) Applicant: AGC Inc., Chiyoda-ku (JP)

(72) Inventors: Eriko Maeda, Tokyo (JP); Hiroyuki Hijiya, Tokyo (JP); Kensuke Nagai, Tokyo (JP); Tetsuya Nakashima, Tokyo (JP); Yutaka Kuroiwa, Tokyo (JP)

(73) Assignee: AGC Inc., Chiyoda-ku (JP)

( * ) Notice: Subject to any disclaimer, the term of this patent is extended or adjusted under 35 U.S.C. 154(b) by 36 days.

(21) Appl. No.: 15/945,144

(22) Filed: Apr. 4, 2018

(65) Prior Publication Data
US 2018/0222789 A1   Aug. 9, 2018

Related U.S. Application Data

(63) Continuation of application No. PCT/JP2016/079688, filed on Oct. 5, 2016.

(30) Foreign Application Priority Data

| Oct. 5, 2015 | (JP) | ................. | 2015-197643 |
| Dec. 7, 2015 | (JP) | ................. | 2015-238570 |
| Mar. 30, 2016 | (JP) | ................. | 2016-067793 |
| Sep. 30, 2016 | (JP) | ................. | 2016-193971 |

(51) Int. Cl.
| C03C 3/091 | (2006.01) |
| C03C 3/087 | (2006.01) |
| C03C 21/00 | (2006.01) |
| G11B 5/73 | (2006.01) |
| C03C 3/085 | (2006.01) |
| C03C 4/20 | (2006.01) |
| G11B 7/24047 | (2013.01) |
| H01F 41/14 | (2006.01) |

(52) U.S. Cl.
CPC ............. C03C 3/091 (2013.01); C03C 3/085 (2013.01); C03C 3/087 (2013.01); C03C 4/20 (2013.01); C03C 21/00 (2013.01); G11B 5/73 (2013.01); C03C 2204/00 (2013.01); G11B 5/7315 (2013.01); G11B 7/24047 (2013.01); H01F 41/14 (2013.01)

(58) Field of Classification Search
CPC .................. C03C 3/087; C03C 3/091
See application file for complete search history.

(56) References Cited

U.S. PATENT DOCUMENTS

| 6,395,368 | B1 | 5/2002 | Yamaguchi et al. |
| 2010/0167091 | A1 | 7/2010 | Tachiwana et al. |
| 2011/0003483 | A1 | 1/2011 | Nishizawa et al. |
| 2011/0064951 | A1 | 3/2011 | Fujiwara et al. |
| 2011/0123832 | A1 | 5/2011 | Matsumoto et al. |
| 2012/0021892 | A1 | 1/2012 | Tachiwana et al. |
| 2012/0141668 | A1 | 6/2012 | Nakashima |
| 2012/0328907 | A1 | 12/2012 | Tachiwana et al. |
| 2014/0302346 | A1 | 10/2014 | Tachiwana et al. |

FOREIGN PATENT DOCUMENTS

| JP | 2000-119042 | | 4/2000 |
| JP | 2001-180969 | | 7/2001 |
| JP | 2012-256424 | | 12/2012 |
| JP | 2012256424 | A * | 12/2012 |
| JP | 2013-028512 | | 2/2013 |
| JP | 2013028512 | A * | 2/2013 |
| SG | 187326 | A1 | 2/2013 |
| WO | WO 2007/142324 | A1 | 12/2007 |
| WO | WO 2011/019010 | A1 | 2/2011 |
| WO | WO 2011/136027 | A1 | 11/2011 |

OTHER PUBLICATIONS

International Search Report dated Nov. 29, 2016 in PCT/JP2016/079688 filed Oct. 5, 2016 (with English Translation).
Written Opinion dated Nov. 29, 2016 in PCT/JP2016/079688 filed Oct. 5, 2016.
Extended European Search Report dated Apr. 18, 2019 in corresponding European Patent Application No. 16853655.5, 11 pages.

\* cited by examiner

*Primary Examiner* — Elizabeth A. Bolden
(74) *Attorney, Agent, or Firm* — Oblon, McClelland, Maier & Neustadt, L.L.P.

(57) ABSTRACT

The present invention pertains to a glass for a data storage medium substrate which contains a specific amount of each of $SiO_2$, $Al_2O_3$, MgO, CaO, SrO, BaO, $Li_2O$, $Na_2O$, and $K_2O$, in molar percentage based on the oxides, and does not substantially contain $B_2O_3$ or $ZrO_2$, wherein the sum of the $Li_2O$, $Na_2O$, and $K_2O$ contents ($R_2O$), the molar ratio of the $SiO_2$ content to the $Al_2O_3$ content ($SiO_2/Al_2O_3$), and the molar ratio of the sum of the $SiO_2$ and $Al_2O_3$ contents ($SiO_2+Al_2O_3$) to $R_2O[(SiO_2+Al_2O_3)/R_2O]$ fall within their specific ranges, formula (1): $90<[SiO_2]+2\times[Al_2O_3]+0.8\times[RO]-0.5\times[R_2O]$ [in formula (1), RO represents the sum of the MgO, CaO, SrO, and BaO contents] is satisfied, and the glass transition point $T_g$, the alkali resistance, and the acid resistance fall within their specific ranges.

32 Claims, No Drawings

US 10,766,806 B2

GLASS FOR DATA STORAGE MEDIUM SUBSTRATE, GLASS SUBSTRATE FOR DATA STORAGE MEDIUM, AND MAGNETIC DISK

TECHNICAL FIELD

The present invention relates to a glass substrate used for a data storage medium such as a magnetic disk or an optical disk, a glass thereof, and a magnetic disk.

BACKGROUND ART

As a glass for a data storage medium substrate such as a magnetic disk or an optical disk, for example, a lithium-containing aluminosilicate glass with a high Young's modulus or a glass obtained by conducting a chemical strengthening treatment thereon (for example, see PTL 1), or a crystallized glass in which a glass having a specific composition is heat-treated to precipitate a crystal layer (for example, see PTL 2) is used.

In recent years, in accordance with increase in a storage capacity of a hard disk drive, densification of recording progresses at a quick pace. However, along with the densification of recording, miniaturization of a magnetic particle impairs thermal stability, and a crosstalk or a decreased SN ratio of a regenerative signal becomes a problem. Therefore, as a fusion technology of light and magnetism, a technology of thermally assisted magnetic recording attracts attention.

The technology of thermally assisted magnetic recording is a technology of recording by applying an external magnetic field in a state where a magnetic recording layer is irradiated with laser light or near field light to locally heat a portion and coercive force of the portion is lowered, and reading the recorded magnetization with a GMR element or the like. According to the technology of thermally assisted magnetic recording, since recording to a medium having high coercive force can be performed, it is possible to miniaturize a magnetic particle while maintaining thermal stability.

PRIOR ART DOCUMENT

Patent Document

[PTL 1] JP-A-2001-180969
[PTL 2] JP-A-2000-119042

SUMMARY OF THE INVENTION

Problems that the Invention is to Solve

In order to form a multilayer film of a medium having high coercive force on a substrate by using a technology of thermally assisted magnetic recording, there is need to sufficiently heat a substrate and a glass for the substrate is required to have high thermal resistance. In addition, requirement to flatness becomes more severe in accordance with increase of a recording density, and it is required to enhance alkali resistance and acid resistance which are resistance to chemicals used in polishing or washing process of a glass substrate.

However, in a conventional glass for a substrate, improving thermal resistance and improving chemical resistance, in particular, alkali resistance were difficult to be compatible with chemical strengthening treatment for maintaining strength. Further, in such a glass, a liquidus temperature is high, and it is difficult to produce a substrate. Accordingly, an object of the present invention is to provide a glass for a substrate, which has high thermal resistance and high chemical resistance, in particular, alkali resistance, and is capable of being chemically strengthened.

Means for Solving the Problems

The present inventors have found that it is possible to improve chemical resistance, in particular, alkali resistance and perform chemical strengthening while improving thermal resistance compared to a conventional glass for data storage medium substrate, by controlling a glass composition of $SiO_2$, an alkali metal oxide, $Al_2O_3$, and the like to be in an optimal range, and completed the present invention.

In order to achieve the above described object, according to a first invention, there is provided a glass for a data storage medium substrate, satisfying the following Formula, having a glass transition point $T_g$ being higher than 680° C., having an alkali resistance being lower than 2 mg/cm$^2$, having an acid resistance being lower than 0.1 mg/cm$^2$, and being any one of (i) to (iii) below:

$$90 < [SiO_2] + 2 \times [Al_2O_3] + 0.8 \times [RO] - 0.5 \times [R_2O] \quad \text{Formula;}$$

in the Formula, RO represents a total content of MgO, CaO, SrO, and BaO;
(i) in terms of mole percentage based on oxides below, containing 60% or more of $SiO_2$, more than 8.5% and less than 13% of $Al_2O_3$, 0 to 13% of MgO, 1 to 12% of CaO, 0 to 2% of SrO, 0 to 2% of BaO, 0% or more and less than 4% of $Li_2O$, 3 to 12% of $Na_2O$, and 0% or more and less than 4% of $K_2O$, having a total content ($R_2O$) of $Li_2O$, $Na_2O$, and $K_2O$ being 3 to 12%, containing substantially no $B_2O_3$ and $ZrO_2$, having a molar ratio ($SiO_2/Al_2O_3$) of the $SiO_2$ content to the $Al_2O_3$ content being higher than 5, and having a molar ratio $[(SiO_2+Al_2O_3)/R_2O]$ of a total content ($SiO_2+Al_2O_3$) of $SiO_2$ and $Al_2O_3$ to $R_2O$ being higher than 9;
(ii) in terms of mole percentage based on oxides below, containing 60% or more of $SiO_2$, more than 6.5% and less than 13% of $Al_2O_3$, 0 to 13% of MgO, 1 to 12% of CaO, 0 to 2% of SrO, 0 to 2% of BaO, 0% or more and less than 4% of $Li_2O$, 3 to 12% of $Na_2O$, and 0% or more and less than 4% of $K_2O$, having a total content ($R_2O$) of $Li_2O$, $Na_2O$, and $K_2O$ being 3 to 12%, containing substantially no $B_2O_3$, having a molar ratio ($SiO_2/Al_2O_3$) of the $SiO_2$ content to the $Al_2O_3$ content being higher than 5, and having a molar ratio $[(SiO_2+Al_2O_3)/R_2O]$ of a total content ($SiO_2+Al_2O_3$) of $SiO_2$ and $Al_2O_3$ to $R_2O$ being higher than 9; and
(iii) in terms of mole percentage based on oxides below, containing 60% or more of $SiO_2$, more than 6.5% and less than 13% of $Al_2O_3$, 0 to 13% of MgO, 1 to 12% of CaO, 0 to 2% of SrO, 0 to 2% of BaO, 0% or more and less than 4% of $Li_2O$, 3 to 12% of $Na_2O$, 0% or more and less than 4% of $K_2O$, and 0.1 to 10% of $TiO_2$, having a total content ($R_2O$) of $Li_2O$, $Na_2O$, and $K_2O$ being 3 to 12%, containing substantially no $B_2O_3$ and $ZrO_2$, having a molar ratio ($SiO_2/Al_2O_3$) of the $SiO_2$ content to the $Al_2O_3$ content being higher than 5, and having a molar ratio $[(SiO_2+Al_2O_3)/R_2O]$ of a total content ($SiO_2+Al_2O_3$) of $SiO_2$ and $Al_2O_3$ to $R_2O$ being higher than 9.

According to a second invention, there is provided a glass for a data storage medium substrate, in terms of mole percentage based on oxides below, containing 4% or more of $Al_2O_3$, having a molar ratio (MgO/RO) of MgO to a total content (RO) of MgO, CaO, SrO, and BaO being 0.7 or lower, having a glass transition point $T_g$ being higher than 680° C., having an alkali resistance being lower than 2 mg/cm², and having an acid resistance being lower than 0.1 mg/cm².

In addition, the present invention provides a glass substrate for a data storage medium formed of the glass for a data storage medium substrate. In addition, the present invention provides a magnetic disk in which a magnetic recording layer is formed on the glass substrate for a data storage medium.

Advantageous Effect of the Invention

The glass for a data storage medium substrate of the present invention is excellent in thermal resistance and appropriate for thermally assisted magnetic recording as the glass transition point thereof can be higher than 680° C., and it is possible to further increase a recording density of the data storage medium. In addition, the glass for a data storage medium substrate of the present invention is excellent in chemical resistance, in particular, alkali resistance. Since surface roughening hardly occurs even in the case of being exposed to chemicals with high pH in a polishing process or a washing process of the glass, it is possible to improve flatness and a recording density of a magnetic disk.

Moreover, the glass for a data storage medium substrate of the first invention contains 3 to 12% of $R_2O$, therefore the glass is appropriate for a chemical strengthening treatment. In addition, the glass for a data storage medium substrate of the second invention contains 4% or more of $Al_2O_3$ and a molar ratio (MgO/RO of MgO to RO is 0.7 or lower. Accordingly, phases are difficult to be separated, surface roughness after polishing is prevented from being deteriorated, and it is easy to increase a storage density of a data storage medium since the glass transition point $T_g$ is high.

MODE FOR CARRYING OUT THE INVENTION

The glass for a data storage medium substrate of the present invention (hereinafter, simply referred to as the glass of the present invention, in some cases) is used for a substrate for a data storage medium such as a magnetic disk or an optical disk. Unless otherwise stated, the composition is expressed in terms of mole percentage.

In addition, in the present specification, "to" which indicates a numerical range is used in the meaning that the numerical values described before and after the "to" are included as a lower limit value and an upper limit value, and unless otherwise stated, the "to" hereinafter in the present specification is used in the same meaning.

The glass transition point $T_g$ of the glass of the present invention is higher than 680° C., preferably higher than 685° C., more preferably higher than 690° C., particularly preferably higher than 700° C., still more preferably higher than 705° C., and most preferably higher than 710° C. The reason why the glass transition point is set to higher than 680° C. is that it becomes easy to increase a storage density of a data storage medium. That is, in order to increase a storage density, it is effective to increase coercive force of a magnetic layer that is a magnetic recording layer. Therefore, it is necessary to perform a heat treatment, which is carried out in forming of the magnetic layer, at a higher temperature. In the case where the glass transition point of a glass used for a substrate for a data storage medium is 680° C. or lower, the heat treatment may not be performed at a desired temperature.

The alkali resistance of the glass of the present invention (mass decrement per area after the glass is immersed in a 0.1 mol/l NaOH aqueous solution at 90° C. for 20 hours) is less than 2 mg/cm², preferably less than 1.75 mg/cm², more preferably less than 1.5 mg/cm², further preferably less than 1 mg/cm², particularly preferably less than 0.85 mg/cm², still more preferably less than 0.7 mg/cm², and most preferably less than 0.3 mg/cm². The reason why the alkali resistance described above is preferable is that, in the case of being exposed to chemicals with high pH in a polishing process or a washing process of the glass, surface roughening hardly occurs.

The acid resistance of the glass of the present invention (mass decrement per area after the glass is immersed in a 0.1 mol/l HCl aqueous solution at 90° C. for 20 hours) is less than 0.1 mg/cm², preferably less than 0.075 mg/cm², more preferably less than 0.05 mg/cm², further preferably less than 0.025 mg/cm², particularly preferably less than 0.02 mg/cm², still more preferably less than 0.01 mg/cm², and most preferably less than 0.004 mg/cm². The reason why the acid resistance described above is preferable is that, in the case of being exposed to chemicals with low pH in a polishing process or a washing process of the glass, surface roughening hardly occurs.

The glass of the present invention has a liquidus temperature TL of preferably lower than 1300° C., more preferably lower than 1285° C., particularly preferably lower than 1270° C., and most preferably lower than 1260° C. The reason why the liquidus temperature TL described above is preferable is that it is easy to perform forming by using a float method.

The glass of the present invention has a density of preferably less than 2.55 g/cm³, more preferably less than 2.53 g/cm³, particularly preferably less than 2.51 g/cm³, and most preferably less than 2.5 g/cm³. The reason why the density described above is preferable is that reduction in weight of a data recording medium is realized. In addition, the reason is that in the case where thinning of a substrate is performed for increasing a recording capacity of a recording medium and a space between the recording medium and a read head is reduced, deflection or warpage of the substrate in accordance with the thinning of the substrate is prevented from increasing. In addition, the reason is that when a recording medium is shocked, a substrate is difficult to deflect, stress is prevented from occurring, and the substrate is difficult to crack.

The glass of the present invention has a specific modulus (Young's modulus/density) of preferably 31 MNm/kg or higher, more preferably 31.2 MNm/kg or higher, further preferably 31.4 MNm/kg or higher, particularly preferably 31.6 MNm/kg or higher, still more preferably 32 MNm/kg or higher, and most preferably 32.4 MNm/kg or higher. The reason why the specific modulus described above is preferable is that warpage or deflection which occurs during rotation of a hard disk drive can be reduced and it is possible to cope with densification of a magnetic recording medium.

The glass of the present invention has a temperature $T_2$ at which a viscosity η reaches $10^2$ poises (dPa·s) being preferably lower than 1770° C., more preferably lower than 1750° C., further preferably lower than 1730° C., particularly preferably lower than 1720° C., and most preferably lower than 1700° C. The reason why $T_2$ described above is preferable is that in the case where a mass production is performed by using a float method, a fusion method, a down draw method, a press method, or the like, a yield decrease due to devitrification is prevented.

The glass of the present invention has a temperature $T_4$ at which the viscosity η reaches $10^4$ poised (dPa·s) being preferably lower than 1310° C., more preferably lower than 1300° C., particularly preferably lower than 1290° C., and most preferably lower than 1280° C. The reason why $T_4$ described above is preferable is that in the case where a mass production is performed by using a float method, a fusion method, a down draw method, a press method, or the like, a yield decrease due to devitrification is prevented.

The glass of the present invention has the Young's modulus of preferably 75 GPa or higher, more preferably 76 GPa or higher, further preferably 77 GPa or higher, particularly preferably 78 GPa or higher, still more preferably 79 GPa or higher, and most preferably 80 GPa or higher. The reason why the Young's modulus described above is preferable is that in the case where thinning of a substrate is performed for increasing a recording capacity of a recording medium and a space between the recording medium and a read head is reduced, deflection or warpage of the substrate in accordance with the thinning of the substrate is prevented from increasing. In addition, the reason is that when a recording medium is shocked, a substrate is difficult to deflect, stress is prevented from occurring, and the substrate is difficult to crack.

The glass of the present invention has an average linear expansion coefficient at 50° C. to 350° C. (hereinafter, referred to as a thermal expansion coefficient in some cases) being preferably $10 \times 10^{-7}$° C. or higher, more preferably $20 \times 10^{-7}$° C. or higher, further preferably $30 \times 10^{-7}$° C. or higher, particularly preferably $40 \times 10^{-7}$° C. or higher, and most preferably $50 \times 10^{-7}$° C. or higher. The reason why the thermal expansion coefficient described above is preferable is that a thermal expansion coefficient closer to the thermal expansion coefficient of metal of a hub attached to a substrate for a data storage medium (typically, $100 \times 10^{-7}$° C. or higher), at least a thermal expansion coefficient equal to or higher than the thermal expansion coefficient of a conventionally used soda lime silica glass is required. Meanwhile, in order to prevent thermal cracking caused by uneven temperature of a substrate from occurring during heating at a high temperature, the thermal expansion coefficient is preferably $100 \times 10^{-7}$° C. or lower, more preferably $80 \times 10^{-7}$° C. or lower, further preferably $65 \times 10^{-7}$° C. or lower, particularly preferably $60 \times 10^{-7}$° C. or lower, still more preferably $58 \times 10^{-7}$° C. or lower, and most preferably $55 \times 10^{-7}$° C. or lower.

The composition (a content of each component) of the glass for a substrate of the present invention will be described based on oxide, unless otherwise stated, in terms of mole percentage.

(First Invention)

The composition of the glass of the first invention will be described. $SiO_2$ is an essential component forming networks of the glass. A content of $SiO_2$ is 60% or more, preferably 62% or more, more preferably 64% or more, further preferably 64.5% or more, further more preferably 65% or more, particularly preferably 65.5% or more, still more preferably 66% or more, and most preferably 66.5% or more. In addition, the content of $SiO_2$ is preferably 80% or less, more preferably 75% or less, further preferably 73% or less, further more preferably 71% or less, particularly preferably 70% or less, still more preferably 69.5% or less, and most preferably 69% or less.

The content of $SiO_2$ is set to 60% or more, whereby the glass transition point is easily secured in the case where a large amount of $Al_2O_3$ is contained or $ZrO_2$ is contained. In addition, the content of $SiO_2$ is set to 60% or more, whereby it is possible to prevent the glass from being unstable and the glass transition point and chemical resistance from deteriorating. In addition, the content of $SiO_2$ is set to 80% or less, whereby it is possible to prevent the thermal expansion coefficient from being too small and a melting temperature for producing the glass from being too high. In the case where it is desired to provide high surface compressive stress or deep strengthened layer through chemical strengthening, the content is preferably 68% or more, more preferably 69% or more, further preferably 70% or more, and particularly preferably 71% or more. In the case where it is desired to increase Young's modulus, the content of $SiO_2$ is preferably 70% or less, more preferably 68% or less, further preferably 67% or less, particularly preferably 66% or less, still more preferably 65% or less, and most preferably 64.5% or less.

$Al_2O_3$ has an effect of increasing chemical resistance and glass transition point of the glass, and is an essential component. Also $Al_2O_3$ has an effect of increasing the glass transition point. A content of $Al_2O_3$ is more than 6.5%, preferably 7% or more, more preferably 8% or more, further preferably more than 8.5%, further preferably 9% or more, and particularly preferably 9.5% or more. In addition, the content is less than 13%, preferably 12.5% or less, and more preferably 12% or less.

The content of $Al_2O_3$ is set to more than 6.5%, whereby the effects described above can be obtained. In addition, the content of $Al_2O_3$ is set to less than 13%, whereby it is possible to prevent viscosity of the molten glass from being too high, and forming, in particular, float forming from being difficult. In addition, it is possible to prevent the liquidus temperature from being too high.

A total content of $SiO_2$ and $Al_2O_3$ is preferably 68% or more, more preferably 72% or more, further preferably 74% or more, particularly preferably 75% or more, and still more preferably 76% or more. In addition, the total content is preferably 81% or less, more preferably 80% or less, and further preferably 79% or less.

The total content of $SiO_2$ and $Al_2O_3$ is set to 68% or more, whereby it is possible to prevent the glass transition point $T_g$ from decreasing and to improve chemical resistance. In addition, the total content is set to 81% or less, whereby it is possible to prevent viscosity of the glass at a high temperature from deteriorating.

MgO is not an essential component, but has effects of lowering viscosity of the molten glass to make the glass easy to be melted and increasing Young's modulus. A content of MgO is 13% or less, preferably 12.5% or less, more preferably 12% or less, and particularly preferably 11.5% or less. In the case where it is desired to particularly improve the acid resistance and alkali resistance, the content of MgO is more preferably 5% or less and further preferably 4% or less.

The content of MgO is set to 13% or less, whereby it is possible to prevent chemical resistance from being deteriorated, the glass from being unstable, and the liquidus temperature from being too high. A lower limit thereof is not particularly limited, but in the case where MgO is contained, the content thereof is preferably 1% or more, more preferably 2% or more, further preferably 2.5% or more, particularly preferably 3% or more, and still more preferably 3.5% or more. In the case where it is desired to provide high surface compressive stress or deep strengthened layer through chemical strengthening, the content is preferably 3% or more, more preferably 4% or more, further preferably 5% or more, and particularly preferably 6% or more.

CaO has effects of making viscosity of the molten glass low, increasing Young's modulus, or making the glass easy to be melted. A content of CaO is 12% or less, preferably 11.5% or less, more preferably 11% or less, and particularly preferably 10.5% or less. In addition, the content is 1% or more, preferably 4% or more, more preferably 7% or more, further preferably 7.5% or more, particularly preferably 8% or more, still more preferably 8.5% or more, and most preferably 9% or more.

The content of CaO is set to 12% or less, whereby it is possible to prevent chemical resistance of the glass from being deteriorated, the glass from being unstable, or the liquidus temperature from being too high. In the case where the content of CaO is set to less than 1%, the thermal expansion coefficient tends to be lowered. There arise problems, for example, if, in order to avoid the tendency, an alkali metal oxide is increased, the glass transition point decreases; if SrO and BaO is increased, the density increases; if MgO is increased, the liquidus temperature increases; and the like. In the case where it is desired to provide high surface compressive stress or deep strengthened layer through chemical strengthening, the content is preferably 10% or less, more preferably 8% or less, further preferably 6% or less, particularly preferably 5% or less, and still more preferably 4% or less.

SrO is not an essential component, but has effects of increasing the thermal expansion coefficient and lowering viscosity of the molten glass to make the glass easy to be melted. A content of SrO is 2% or less, preferably 1.5% or less, more preferably 1% or less, and particularly preferably 0.5% or less.

The content of SrO is set to 2% or less, whereby it is possible to prevent chemical resistance from being deteriorated, the glass from being unstable, the liquidus temperature from being too high, or the density of the glass from being too high. A lower limit thereof is not particularly limited, but in the case where SrO is contained, the content thereof is preferably 0.01% or more.

BaO is not an essential component, but has effects of increasing the glass transition point, increasing the thermal expansion coefficient, and lowering viscosity of the molten glass to make the glass easy to be melted. A content of BaO is 2% or less, preferably 1.5% or less, more preferably 1% or less, and particularly preferably 0.5% or less.

The content of BaO is set to 2% or less, whereby it is possible to prevent weathering resistance of the glass from lowering, the liquidus temperature from being too high, or the density of the glass from being too high. A lower limit thereof is not particularly limited, but in the case where BaO is contained, the content thereof is preferably 0.5% or more. In the case where it is desired to further improve the weathering resistance, it is preferable that BaO is substantially not contained. In the present specification, an expression "substantially not contained" has the meaning of not intentionally contained in the raw material, and does not exclude inclusion of inevitable impurities. Specifically, the expression means that content is less than 0.01%.

A total content (RO) of MgO, CaO, SrO, and BaO is 1% or higher, preferably 4% or more, more preferably 6% or more, further preferably 8% or more, particularly preferably 10% or more, still more preferably 11% or more, still further preferably 11.5% or more, and most preferably 12% or more. In addition, the total content (RO) is 20% or less, preferably 18% or less, more preferably 17% or less, further preferably 16% or less, particularly preferably 15% or less, still more preferably 14% or less, and most preferably 13% or less.

RO is set to 1% or more, whereby viscosity of the molten glass can be lowered to make the glass easy to be melted and Young's modulus can be increased. In addition, RO is set to 20% or less, whereby it is possible to prevent the glass transition point from being lowered, weathering resistance, the acid resistance, or the alkali resistance of the glass from deteriorating, or the liquidus temperature from being too high.

$Li_2O$ is not an essential component, but has an effect of lowering viscosity of the molten glass to make the glass easy to be melted. In the case where $Li_2O$ is contained, it is possible to increase substrate strength through a chemical strengthening treatment for imparting compressive stress to a glass surface by ion exchange. A content of $Li_2O$ is less than 4%, preferably 3% or less, more preferably 2.5% or less, and further preferably 2% or less. However, since in some glass composition, phase separation may be caused and surface roughening may occur in a polishing process, the content is particularly preferably 1% or less, still more preferably 0.5% or less, and most preferably not contained.

The content of $Li_2O$ is set to less than 4%, whereby it is possible to prevent the glass transition point from being lowered, the density of the glass from being too high, or weathering resistance from deteriorating. A lower limit thereof is not particularly limited, but in the case where $Li_2O$ is contained, the content thereof is preferably 0.01% or more.

$Na_2O$ is essential and has effects of increasing the thermal expansion coefficient and lowering viscosity of the molten glass to make the glass easy to be melted. In the case where $Na_2O$ is contained, it is possible to increase substrate strength through a chemical strengthening treatment for imparting compressive stress to a glass surface by ion exchange. A content of $Na_2O$ is 3% or more, preferably 3.5% or more, more preferably 4% or more, further preferably 4.5% or more, particularly preferably 5% or more, still more preferably 5.5% or more, and most preferably 6% or more. In addition, the content is 12% or less, preferably 11% or less, more preferably 10% or less, further preferably 9% or less, particularly preferably 8% or less, still more preferably 7.5% or less, and most preferably 7% or less.

The content of $Na_2O$ is set to 3% or more, whereby it is possible to prevent the thermal expansion coefficient from being lowered. In addition, the content of $Na_2O$ is set to 12% or less, whereby it is possible to prevent the glass transition point from being lowered, the density of the glass from being too high, or weathering resistance, the acid resistance, or the alkali resistance of the glass from deteriorating.

$K_2O$ is not an essential component, but has effects of increasing the thermal expansion coefficient and lowering viscosity of the molten glass to make the glass easy to be melted. In the case where $K_2O$ is contained, it is possible to increase an ion-exchange rate in a chemical strengthening treatment. The content of $K_2O$ is less than 4%, preferably 3.5% or less, more preferably 3% or less, further preferably 2.5% or less, still further preferably 2% or less, still more preferably 1.5% or less, and particularly preferably 1% or less. In the case where it is desired to further improve chemical resistance, $K_2O$ is still more preferably 0.5% or less and is most preferably not substantially contained.

The content of $K_2O$ is set to 4% or less, whereby it is possible to prevent the glass transition point from being lowered, weathering resistance of the glass from deteriorating, the density of the glass from being too high, or the liquidus temperature from being too high. A lower limit thereof is not particularly limited, but in the case where $K_2O$ is contained, the content thereof is preferably 0.01% or more.

A total content ($R_2O$) of $Li_2O$, $Na_2O$, and $K_2O$ is 3% or more, preferably 4% or more, more preferably 4.5% or more, particularly preferably 5% or more, still more preferably 5.5% or more, still further preferably 6% or more, and most preferably 6.5% or more. In addition, the total content ($R_2O$) is 12% or less, preferably 11% or less, more preferably 10% or less, particularly preferably 9% or less, still more preferably 8% or less, still further preferably 7.5% or less, and most preferably 7% or less.

$R_2O$ is set to 3% or more, whereby it is possible to prevent an efficiency of chemical strengthening through an ion exchange treatment from being lowered. In addition, $R_2O$ is set to 12% or less, whereby it is possible to prevent the glass transition point from being lowered, weathering resistance, the acid resistance, or the alkali resistance of the glass from deteriorating, or the liquidus temperature from being too high.

The glass of the first invention does not substantially contain $B_2O_3$ in order to improve productivity (the content is substantially zero). In the case where $B_2O_3$ is contained, an amount of volatile components increases in melting process during production process and the glass may become heterogeneous due to extraneous incorporation.

In addition, it is preferable that the glass of the first invention does not substantially contain $ZrO_2$ (the content is substantially zero) in order to lower the specific modulus. $ZrO_2$ has effects of improving chemical resistance of the glass and improving thermal resistance. The content of $ZrO_2$ is preferably 5% or less, more preferably 4% or less, further preferably 2% or less, and particularly preferably 1.5% or less. $ZrO_2$ is set to 5% or less, whereby it is possible to prevent specific gravity from increasing and the specific modulus from being lowered. In the case where $ZrO_2$ is contained, the content thereof is preferably 0.1% or more, more preferably 0.2% or more, further preferably 0.5% or more, and particularly preferably 1% or more.

A molar ratio ($SiO_2/Al_2O_3$) of the $SiO_2$ content to the $Al_2O_3$ content is higher than 5, preferably 5.1 or higher, more preferably 5.2 or higher, and particularly preferably 5.3 or higher. An upper limit thereof is not particularly limited, but the ratio is 10 or lower in general, more preferably 9 or lower, and further preferably 8 or lower. ($SiO_2/Al_2O_3$) is set to higher than 5, whereby it is possible to prevent chemical resistance from deteriorating or the glass transition point from being lowered. In addition, ($SiO_2/Al_2O_3$) is set to 10 or lower, whereby it is possible to make the glass raw material easy to be melted while securing the glass transition point.

A molar ratio $[(SiO_2+Al_2O_3)/R_2O]$ of a total content ($SiO_2+Al_2O_3$) of $SiO_2$ and $Al_2O_3$ to $R_2O$ is higher than 9, preferably 9.2 or higher, more preferably 9.4 or higher, and particularly preferably 9.6 or higher. An upper limit thereof is not particularly limited, but the ratio is 17 or lower in general, more preferably 15 or lower, further preferably 14 or lower, and particularly preferably 13 or lower. $[(SiO_2+Al_2O_3)/R_2O]$ is set to higher than 9, whereby it is possible to prevent chemical resistance from deteriorating or the glass transition point from being lowered. In addition, $[(SiO_2+Al_2O_3)/R_2O]$ is set to 17 or lower, whereby it is possible to secure solubility of the glass.

In the glass of the first invention, a lower limit of the value obtained by the Formula (1) is more than 90, preferably 91 or more, more preferably 92 or more, particularly preferably 93 or more, and most preferably 94 or more. An upper limit thereof is not particularly limited, but it is 110 or less in general and more preferably 100 or less. The lower limit of the value obtained by the Formula (1) is set to more than 90, whereby it is possible to prevent the glass transition point from being lowered. In addition, the upper limit of the value obtained by the Formula (1) is set to 110 or less, whereby it is possible to prevent the glass from being difficult to be melted.

$$[SiO_2]+2\times[Al_2O_3]+0.8\times[RO]-0.5\times[R_2O] \qquad \text{Formula (1)}$$

In the Formula (1), RO represents the total content of MgO, CaO, SrO, and BaO.

In the glass of the first invention, an upper limit of the value obtained by the Formula (2) is preferably less than 30, more preferably 29 or less, further preferably 28 or less, further more preferably 27 or less, particularly preferably 28 or less, and most preferably 25 or less. A lower limit thereof is not particularly limited, but it is −40 or more in general, more preferably −20 or more, further preferably −10 or more, and particularly preferably 0 or more. The upper limit of the value obtained by the Formula (2) is set to less than 30, whereby it is possible to prevent chemical resistance from deteriorating. In addition, the lower limit of the value obtained by the Formula (2) is set to −40 or more, whereby it is possible to prevent weathering resistance from deteriorating or solubility of the glass from deteriorating.

$$3\times[MgO]+6\times[Al_2O_3]-0.4\times[CaO]+0.4\times[Na_2O]-[SiO_2] \qquad \text{Formula (2)}$$

The glass of the first invention is substantially or essentially formed of the components described above, and in addition to the components, components exemplified in the following and the like may be contained in a range not impairing the object of the present invention. A total content of components other than the components described above is preferably 20% or less, more preferably 5% or less, further preferably 3% or less, particularly preferably 2% or less, still more preferably 1% or less, and most preferably 0.5% or less.

A refining agent such as $SO_3$, Cl, F, $SnO_2$, $As_2O_3$, or $Sb_2O_3$, or a coloring agent such as $Fe_2O_3$, NiO, Se, $CeO_2$, $Cr_2O_3$, or CoO may be contained up to 5% in total.

In the case where a content of the refining agent is too large, this may affect a physical property of the glass, for example, decreasing of $T_g$. Therefore, the total amount of the refining agent(s) is preferably 1% or less, more preferably 0.7% or less, further preferably 0.4% or less, particularly preferably 0.3% or less, and still more preferably 0.2% or less.

In the case where coloring component is too much, it is difficult to transfer heat to inside of the glass melt at the time of melting. The total amount of the coloring component(s) is preferably 0.5% or less, more preferably 0.2% or less, and further preferably 0.1% or less. Meanwhile, in order to easily transfer heat to inside of the glass melt at the time of melting, the amount to be added is preferably 0.005% or more, more preferably 0.01% or more, further preferably 0.03% or more, and particularly preferably 0.05% or more.

$TiO_2$ has effects of improving chemical resistance of the glass, increasing thermal resistance, and increasing the specific modulus. A content of $TiO_2$ is preferably 0.1% or more, more preferably 1% or more, and further preferably 2% or more. In addition, the content is 10% or less, preferably 8% or less, more preferably 6% or less, further preferably 4% or less, and further more preferably 2% or less. $TiO_2$ is set to 10% or less, whereby it is possible to prevent devitrification temperature from increasing or stability of the glass from deteriorating, for example, easily causing phase separation.

Depending on the composition of the glass, $TiO_2$ may cause phase separation and deteriorate surface roughness after polishing. Therefore, the content of $TiO_2$ is particularly preferably 1% or less and still more preferably 0.5% or less, and it is most preferable to substantially not contain $TiO_2$.

In order to increase the thermal expansion coefficient and lower viscosity of the molten glass to make the glass easy to be melted, ZnO may be contained up to 10% in total. The content of ZnO is more preferably 5% or less and particularly preferably 3% or less.

In the case where manufacturing is performed by using a float method, ZnO may cause a problem such as surface coloring due to reduction in a float bath. Therefore, it is still more preferable to substantially not contain ZnO.

$P_2O_5$, $V_2O_5$, $WO_3$, $MnO_2$, $Nb_2O_5$, $MoO_3$, or the like for improving solubility or stability of the glass, and rare earth metal oxides such as $La_2O_3$ or $Y_2O_3$ for increasing Young's modulus may be contained up to 15% in total. The total content thereof is preferably 5% or less. However, since depending on the composition, devitrification may easily occur, the total content thereof is more preferably 2% or less, further preferably 1% or less, particularly preferably 0.5% or less, and still more preferably 0.2% or less, and it is most preferable to substantially not contain these components.

(Second Invention)

Next, the composition of the glass of the second invention will be described. In the glass of the second invention, a molar ratio (MgO/RO) of MgO to a total content (RO) of alkaline earth metal oxides (MgO, CaO, SrO, and BaO) is 0.7 or lower.

In the glass for a magnetic recording medium substrate disclosed in WO2015/37609 as a prior art, MgO/RO is set to 0.8 or higher in order to increase Young's modulus. However, in the case where a content of MgO is large with respect to a total content of alkaline earth metal oxides, the phase separation in the glass easily occurs. Therefore, there is a problem that surface roughness of the glass may not be sufficiently lowered during polishing.

Accordingly, in the second invention, MgO/RO is set to 0.7 or lower and $Al_2O_3$ is set to 4% or more, whereby low MgO/RO can be compatible with high Tg. MgO/RO is preferably 0.6 or lower, more preferably 0.5 or lower, further preferably 0.4 or lower, particularly preferably 0.3 or lower, still more preferably 0.25 or lower, and most preferably 0.2 or lower. In the case where MgO/RO is higher than 0.7, phase separation in the glass easily occurs, and surface roughness after polishing may be deteriorated. A lower limit thereof is not particularly limited, but, from a view point of increasing Young's modulus, it is preferably 0.05 or higher, more preferably 0.1 or higher, further preferably 0.15 or higher, and particularly preferably 0.2 or higher.

$Al_2O_3$ is 4% or more, preferably 6% or more, more preferably 6.5% or more, further preferably 7% or more, particularly preferably 7.5% or more, still more preferably 8% or more, and most preferably 8.5% or more. In addition, $Al_2O_3$ is less than 15%, preferably 14% or less, more preferably 13% or less, further preferably 12% or less, particularly preferably 11.5% or less, still more preferably 11% or less, and most preferably 10% or less.

A content of $Al_2O_3$ is set to 4% or more, whereby it is possible to obtain the effects described above. In addition, the content of $Al_2O_3$ is set to less than 15%, whereby it is possible to prevent viscosity of the molten glass from being too high, and forming, in particular, float forming from being difficult, while preventing the acid resistance from deteriorating. In addition, it is possible to prevent the liquidus temperature from being too high.

In the glass of the second invention, it is preferable that a content of $B_2O_3$ is 7% or less in order to improve productivity. In the case where more than 7% of $B_2O_3$ is contained, an amount of volatile components increases in melting process during production process and the glass may become heterogeneous due to extraneous incorporation. The content of $B_2O_3$ is more preferably 3% or less, further preferably 2% or less, particularly preferably 1% or less, and still more preferably 0.5% or less, and it is most preferable that $B_2O_3$ is substantially not contained (the content is substantially zero).

In the second invention, in the case where it is desired to suppress roughening of a surface when polished to be flat, a content of MgO is set to preferably less than 5%, more preferably 4.5% or less, and further preferably 4% or less. The content of MgO is set to less than 5%, whereby MgO/RO is also easily suppressed to be small. A lower limit thereof is not particularly limited, but in the case where MgO is contained, the content thereof is preferably 1% or more, more preferably 2% or more, further preferably 2.5% or more, particularly preferably 3% or more, and still more preferably 3.5% or more. In addition, in the case where it is desired to provide high surface compressive stress or deep strengthened layer through chemical strengthening, the content is preferably 3% or more, more preferably 4% or more, and further preferably 4.5% or more.

In the second invention, in the case where the content of MgO is less than 5%, it is preferable to satisfy at least one of the following (1) to (3).

(1) $ZrO_2$ is contained.

$ZrO_2$ is contained, whereby it is possible to further enhance the effect of suppressing roughening of a surface when polished to be flat. A content of $ZrO_2$ is preferably 0.2% or more, more preferably 0.5% or more, further preferably 0.7% or more, and particularly preferably 1% or more. An upper limit thereof is not particularly limited, but, from a view point of suppressing devitrification, it is preferably 4% or less, more preferably 3% or less, further preferably 2.5% or less, particularly preferably 2% or less, and still more preferably 1.5% or less.

(2) 7% or less of $Na_2O$ is contained.

In the case where MgO is less than 5%, $Na_2O$ is set to 7% or less, whereby it is possible to prevent the acid resistance from deteriorating. The content of $Na_2O$ is preferably 7% or less, more preferably 6.5% or less, and further preferably 6% or less.

(3) 9% or less of $Na_2O$, 11% or less of $Al_2O_3$, and 9.5% or less of CaO are contained.

The content of $Na_2O$ is preferably 9% or less, more preferably 8% or less, and further preferably 7% or less. Even in the case where the content of $Na_2O$ is set to 9% or less, $Al_2O_3$ is set to 11% or less and CaO is set to 9.5% or less, whereby it is possible to prevent the acid resistance from deteriorating.

In the above described (3), the content of $Al_2O_3$ is preferably 11% or less, more preferably 10.5% or less, and further preferably 10% or less. The content of $Al_2O_3$ is set to 11% or less, whereby it is possible to prevent the acid resistance from deteriorating. The content of CaO is 9.5% or less, more preferably 8.5% or less, and further preferably 8% or less. The content of CaO is set to 9.5% or less, whereby it is possible to suppress devitrification. In addition, in order to make it easy to melt the glass, the content of CaO is preferably 1% or more, more preferably 4% or more, further preferably 5% or more, particularly preferably 6% or more, still more preferably 7% or more, and most preferably 7.5% or more. In the case where it is desired to provide high surface compressive stress or deep strengthened layer through chemical strengthening, the content is more preferably 8% or less, further preferably 6% or less, particularly preferably 5% or less, and still more preferably 4% or less.

In the second invention, in the case where it is desired to increase Young's modulus, the content of MgO is preferably 5% or more, more preferably 6% or more, further preferably 7% or more, particularly preferably 8% or more, and still more preferably 8.5% or more. In addition, in the case where it is desired to provide high surface compressive stress or deep strengthened layer through chemical strengthening, the content of MgO is preferably 6% or more.

In the second invention, in the case where the content of MgO is 5% or more, it is preferable to satisfy at least one of the following (4) and (5).

(4) $ZrO_2$ is contained.

$ZrO_2$ is contained, whereby it is possible to further enhance the effect of suppressing roughening of a surface when polished to be flat. The content of $ZrO_2$ is preferably 0.2% or more, more preferably 0.5% or more, further preferably 0.7% or more, and particularly preferably 1% or more. An upper limit thereof is not particularly limited, but, from a view point of suppressing devitrification, it is preferably 4% or less, more preferably 3% or less, further preferably 2.5% or less, particularly preferably 2% or less, and still more preferably 1.5% or less.

(5) 8.5% or less of CaO and 10% or less of MgO are contained.

The content of CaO is preferably 8.5% or less, more preferably 8% or less, further preferably 7.5% or less, particularly preferably 7% or less, and still more preferably 6.5% or less. The content of CaO is set to 8.5% or less, whereby it is possible to suppress devitrification. The content of MgO is preferably 10% or less, more preferably 9.5% or less, and further preferably 9% or less. The content of MgO is set to 10% or less and the content of CaO is set to 8.5% or less, whereby high Young's modulus can be compatible with suppressing devitrification when manufacturing the glass. In addition, in order to make it easy to melt the glass, the content of CaO is preferably 1% or more, more preferably 3% or more, further preferably 4% or more, particularly preferably 5% or more, still more preferably 5.5% or more, and most preferably 6% or more. In addition, in the case where it is desired to provide high surface compressive stress or deep strengthened layer through chemical strengthening, the content is more preferably 8% or less, further preferably 6% or less, particularly preferably 5% or less, and still more preferably 4% or less.

In the second invention, $Li_2O$ is not an essential component, but has an effect of lowering viscosity of the molten glass to make the glass easy to be melted. In the case where $Li_2O$ is contained, it is possible to increase substrate strength through a chemical strengthening treatment for imparting compressive stress to the glass surface by ion exchange. Moreover, it is possible to expect an effect of increasing Young's modulus. The content of $Li_2O$ is less than 4%, preferably 3% or less, more preferably 2% or less, particularly preferably 1.5% or less, and still more preferably 1% or less. However, since depending on the glass composition, phase separation may be caused and surface roughening may occur in polishing process, the content is still more preferably 0.5% or less and it is most preferable to not contain $Li_2O$.

The content of $Li_2O$ is set to less than 4%, whereby it is possible to prevent the glass transition point from being lowered, the density of the glass from being too high, or weathering resistance from deteriorating. A lower limit thereof is not particularly limited, but in the case where $Li_2O$ is contained, the content thereof is more preferably 0.2% or more and further preferably 0.5% or more.

$Na_2O$ is not an essential component, but has effects of increasing the thermal expansion coefficient and lowering viscosity of the molten glass to make the glass easy to be melted. In the case where $Na_2O$ is contained, it is possible to increase substrate strength through a chemical strengthening treatment for imparting compressive stress to the glass surface by ion exchange. The content of $Na_2O$ is preferably 0.1% or more, more preferably 0.5% or more, further preferably 1% or more, particularly preferably 3% or more, still more preferably 5% or more, still further preferably 5.5% or more, and most preferably 6% or more. In addition, the content is 12% or less, preferably 11% or less, more preferably 10% or less, further preferably 9% or less, particularly preferably 8% or less, still more preferably 7.5% or less, and most preferably 7% or less.

The content of $Na_2O$ is set to 12% or less, whereby it is possible to prevent the glass transition point from being lowered, the density of the glass from being too high, or weathering resistance or chemical resistance of the glass from deteriorating.

$K_2O$ is not an essential component, but has effects of increasing the thermal expansion coefficient and lowering viscosity of the molten glass to make the glass easy to be melted. In the case where $K_2O$ is contained, it is possible to increase an ion-exchange rate in a chemical strengthening treatment. Meanwhile, in the case where more than 4% of $K_2O$ is contained, chemical resistance deteriorates. The content of $K_2O$ is less than 4%, preferably 3.5% or less, more preferably 3% or less, further preferably 2.5% or less, particularly preferably 2% or less, still more preferably 1% or less, and most preferably 0.5% or less.

The content of $K_2O$ is set to 4% or less, whereby it is possible to prevent the glass transition point from being lowered, weathering resistance or chemical resistance of the glass from deteriorating, the density of the glass from being too high, or the liquidus temperature from being too high. In the case where it is desired to further improve chemical resistance, it is most preferable that $K_2O$ is substantially not contained.

A total content ($R_2O$) of $Li_2O$, $Na_2O$, and $K_2O$ is 1% or more, preferably 3% or more, more preferably 4% or more, particularly preferably 5% or more, still more preferably 5.5% or more, still further preferably 6% or more, and most preferably 6.5% or more. In addition, the total content ($R_2O$) is 12% or less, preferably 11% or less, more preferably 10% or less, particularly preferably 9% or less, still more preferably 8% or less, still further preferably 7.5% or less, and most preferably 7% or less.

$R_2O$ is set to 1% or more, whereby it is possible to prevent an efficiency of chemical strengthening through an ion exchange treatment from being lowered. In addition, $R_2O$ is set to 12% or less, whereby it is possible to prevent the glass transition point from being lowered, weathering resistance or chemical resistance of the glass from deteriorating, or the liquidus temperature from being too high.

SrO is not an essential component, but has effects of increasing the thermal expansion coefficient and lowering viscosity of the molten glass to make the glass easy to be melted. Therefore, in the case where SrO is contained, the content is preferably 7% or less, more preferably 5% or less, further preferably 2% or less, particularly preferably 1% or less, and still more preferably 0.5% or less.

The content of SrO is set to 7% or less, whereby it is possible to prevent chemical resistance from being deteriorated, the glass from being unstable, the liquidus temperature from being too high, or the density of the glass from being too high. A lower limit thereof is not particularly limited, but in the case where SrO is contained, the content thereof is preferably 0.1% or more. In the case where it is desired to further improve weathering resistance, it is preferable that SrO is substantially not contained.

BaO is not an essential component, but has effects of increasing the glass transition point, increasing the thermal expansion coefficient, and lowering viscosity of the molten glass to make the glass easy to be melted. Therefore, in the case of containing BaO, the content thereof is preferably 5% or less, more preferably 4% or less, further preferably 2% or less, particularly preferably 1% or less, and still more preferably 0.5% or less.

The content of BaO is set to 2% or less, whereby it is possible to prevent weathering resistance of the glass from lowering, the liquidus temperature from being too high, or the density of the glass from being too high. A lower limit thereof is not particularly limited, but in the case where BaO is contained, the content thereof is more preferably 0.01% or more. In the case where it is desired to further improve weathering resistance, it is preferable that BaO is substantially not contained.

A total content (RO) of MgO, CaO, SrO, and BaO is 1% or more, preferably 4% or more, more preferably 6% or more, further preferably 8% or more, particularly preferably 10% or more, still more preferably 11% or more, still further preferably 11.5% or more, and most preferably 12% or more. In addition, the total content (RO) is 20% or less, preferably 18% or less, more preferably 17% or less, further preferably 16% or less, particularly preferably 15% or less, still more preferably 14% or less, and most preferably 13% or less.

RO is set to 1% or more, whereby viscosity of the molten glass can be lowered to make the glass easy to be melted and Young's modulus can be increased. In addition, RO is set to 20% or less, whereby it is possible to prevent the glass transition point from being lowered, weathering resistance, the acid resistance, or the alkali resistance of the glass from deteriorating, or the liquidus temperature from being too high.

A molar ratio ($SiO_2/Al_2O_3$) of the $SiO_2$ content to the $Al_2O_3$ content is preferably 4 or higher, more preferably 4.5 or higher, more preferably 5 or higher, particularly preferably 5.5 or higher, still more preferably 6 or higher, and most preferably 6.5 or higher. An upper limit thereof is not particularly limited, but it is 18 or lower in general, more preferably 14 or lower, further preferably 12 or lower, particularly preferably 10 or lower, still more preferably 9.5 or lower, and most preferably 9 or lower. ($SiO_2/Al_2O_3$) is set to 4 or higher, whereby it is possible to prevent chemical resistance from deteriorating or the glass transition point from being lowered. In addition, ($SiO_2/Al_2O_3$) is set to 18 or lower, whereby it is possible to easily secure weathering resistance while securing the glass transition point.

A molar ratio [($SiO_2+Al_2O_3$)/$R_2O$] of a total content ($SiO_2+Al_2O_3$) of $SiO_2$ and $Al_2O_3$ to $R_2O$ is preferably 6 or higher, more preferably 7 or higher, further preferably 8 or higher, particularly preferably 9 or higher, still more preferably 10 or higher, and most preferably 11 or higher. An upper limit thereof is not particularly limited, but it is 17 or lower in general, more preferably 15 or lower, further preferably 14 or lower, and particularly preferably 13 or lower. [($SiO_2+Al_2O_3$)/$R_2O$] is set to 6 or higher, whereby it is possible to prevent chemical resistance from deteriorating or the glass transition point from being lowered. In addition, [($SiO_2+Al_2O_3$)/$R_2O$] is set to 17 or lower, whereby it is possible to secure solubility of the glass.

In the glass of the second invention, a lower limit of the value obtained by the Formula (1) is preferably more than 85, more preferably 90 or more, further preferably 92 or more, particularly preferably 93 or more, still more preferably 94 or more, and most preferably 95 or more. An upper limit thereof is not particularly limited, but it is 110 or less in general, more preferably 100 or less. The lower limit of the value obtained by the Formula (1) is set to more than 85, whereby it is possible to prevent the glass transition point from being lowered. In addition, the upper limit of the value obtained by the Formula (1) is set to 110 or less, whereby it is possible to prevent the glass from being difficult to be melted.

$$[SiO_2]+2\times[Al_2O_3]+0.8\times[RO]-0.5\times[R_2O] \quad \text{Formula (1)}$$

In the Formula (1), RO represents the total content of MgO, CaO, SrO, and BaO.

In the glass of the second invention, an upper limit of the value obtained by the Formula (2) is preferably less than 40, more preferably 35 or less, further preferably 30 or less, particularly preferably 20 or less, still more preferably 10 or less, and most preferably 5 or less. A lower limit thereof is not particularly limited, but it is −40 or more in general, more preferably −20 or more, further preferably −10 or more, particularly preferably 0 or more. The upper limit of the value obtained by the Formula (2) is set to less than 40, whereby it is possible to prevent chemical resistance from deteriorating. In addition, the lower limit of the value obtained by the Formula (2) is set to −40 or more, whereby it is possible to prevent weathering resistance from deteriorating or solubility of the glass from deteriorating.

$$3\times[MgO]+6\times[Al_2O_3]-0.4\times[CaO]+0.4\times[Na_2O]-[SiO_2] \quad \text{Formula (2)}$$

A composition of the glass of the second invention other than the above composition is the same as the composition of the glass of the first invention.

The glass substrate for a data storage medium of the present invention is used for a substrate for a data storage medium such as a magnetic disk or an optical disk.

The glass substrate for a data storage medium of the present invention is typically a circular glass sheet of which a thickness is 0.5 to 1.5 mm and a diameter is 48 to 93 mm. In the glass substrate for a magnetic disk or the like, a hole having a diameter of 15 to 25 mm is formed at the center thereof in general.

In the magnetic disk of the present invention, at least a magnetic layer as a magnetic recording layer is formed on a main surface of the glass substrate for a data storage medium of the present invention, and in addition to this, a base layer, a protective layer, a lubricant layer, an irregularity control layer, or the like may be formed as necessary in some cases.

A method of manufacturing the glass and the glass substrate of the present invention is not particularly limited, and various methods can be employed. For example, raw materials of respective components commonly used are blended to have a target composition, and are heated and melted in a glass furnace. The glass is homogenized by bubbling, stirring, addition of a refining agent, and the like, followed by being formed into a sheet glass having a predetermined thickness by using a well-known method such as a float method, a press method, and a down draw method. After annealing, machining such as grinding or polishing is performed as necessary, to thereby obtain a glass substrate having a predetermined size and shape. As a forming method, in particular, the float method appropriate for a mass production is preferable.

Examples

Raw materials of respective components were blended to have a composition shown in terms of mole percentage in the column from $SiO_2$ to $K_2O$ in Tables 1 to 4, and were melted by using a platinum crucible at 1550° C. to 1650° C. for 3 to 5 hours. Next, the molten glass was poured out to be formed into a sheet shape, and annealed.

For the glass sheet obtained in this manner, the $T_g$ (unit: ° C.), acid resistance (unit: $mg/cm^2$), alkali resistance (unit: $mg/cm^2$), liquidus temperature TL (unit: ° C.), density d (unit: $g/cm^3$), Young's modulus E (unit: GPa), specific modulus E/d (unit: MNm/kg), thermal expansion coefficient α (unit: $10^{-7}/°C.$), temperature $T_2$ (unit: ° C.) at which the viscosity reaches $10^2 P=10^2$ dPa·s, and temperature $T_4$ (unit: ° C.) at which the viscosity reaches $10^4 P=10^4$ dPa·s were measured or evaluated by using methods described below.

$T_g$: an elongation percentage of the glass when a temperature is raised from a room temperature at a rate of 5° C./min was measured up to a temperature at which the glass softened and the elongation was no longer observed, that is, up to a yield point by a differential dilatometer using quartz glass as a reference material, and a temperature corresponding to the yield point in a thermal expansion curve was set to a glass transition point.

Acid resistance: Both surfaces of the glass sheet having a thickness of 2 mm and a size of 4 cm×4 cm was subjected to mirror polishing by using cerium oxide, and washed by using calcium carbonate and a neutral detergent, followed by being immersed in a 0.1 mol/l HCl aqueous solution heated to 90° C. for 20 hours. A mass decrement of the glass before and after the immersion and surface area of the glass were measured and a ratio thereof was obtained to set as the acid resistance.

Alkali resistance: Both surface of the glass sheet having a thickness of 2 mm and a size of 4 cm×4 cm was subjected to mirror polishing by using cerium oxide, and washed by using calcium carbonate and a neutral detergent, followed by being immersed in a 0.1 mol/l NaOH aqueous solution heated to 90° C. for 20 hours. A mass decrement of the glass before and after the immersion and surface area of the glass were measured and a ratio thereof was obtained to set as the acid resistance.

$T_L$: The glass was pulverized into glass particles each having a size of appropriately 2 mm by using a mortar. The glass particles were placed side by side on a platinum boat and were heat-treated in a temperature gradient furnace for 24 hours. The highest value of a temperature of the glass particles in which crystals were precipitated was set as the liquidus temperature.

d: Measuring was performed by using Archimedes method.

E: The glass sheet having a thickness of 8 to 20 mm and size of 4 cm×4 cm was measured by using an ultrasonic pulse method.

α: An average linear expansion coefficient at 50 to 350° C. was calculated from the thermal expansion curve obtained in the same manner as in the measurement of $T_g$ described above.

$T_2$ and $T_4$: Measuring was performed by a rotational viscometer.

Results thereof are shown in Tables 1 to 10. A symbol "–" in Tables 2 to 10 represents that measuring was not performed and a symbol "*" represents a value obtained by calculation from the composition. The glass of each of Examples 1 to 11 and 16 to 98 represents Invention Examples and glass of each of Examples 12 to 15 represents Comparative Examples.

TABLE 1

| | Example | | | | | | | | | |
|---|---|---|---|---|---|---|---|---|---|---|
| | 1 | 2 | 3 | 4 | 5 | 6 | 7 | 8 | 9 | 10 |
| $SiO_2$ | 68 | 68 | 68 | 68 | 68 | 68 | 68 | 66 | 65 | 66 |
| $Al_2O_3$ | 10 | 10 | 10 | 11 | 10 | 10 | 10 | 11 | 12 | 12 |
| $B_2O_3$ | 0 | 0 | 0 | 0 | 0 | 0 | 0 | 0 | 0 | 0 |
| MgO | 12 | 10 | 7 | 11 | 9 | 7 | 9 | 10 | 10 | 5 |
| CaO | 2 | 4 | 7 | 2 | 7 | 9 | 9 | 6 | 5 | 9 |
| SrO | 0 | 0 | 0 | 0 | 0 | 0 | 0 | 0 | 0 | 0 |
| BaO | 0 | 0 | 0 | 0 | 0 | 0 | 0 | 0 | 0 | 0 |
| $ZrO_2$ | 0 | 0 | 0 | 0 | 0 | 0 | 0 | 0 | 0 | 0 |
| $Li_2O$ | 0 | 0 | 0 | 0 | 0 | 0 | 0 | 0 | 0 | 0 |
| $Na_2O$ | 8 | 8 | 8 | 8 | 6 | 6 | 4 | 7 | 8 | 8 |
| $K_2O$ | 0 | 0 | 0 | 0 | 0 | 0 | 0 | 0 | 0 | 0 |
| $TiO_2$ | 0 | 0 | 0 | 0 | 0 | 0 | 0 | 0 | 0 | 0 |
| RO | 14.0 | 14.0 | 14.0 | 13.0 | 16.0 | 16.0 | 18.0 | 16.0 | 15.0 | 14.0 |
| $R_2O$ | 8.0 | 8.0 | 8.0 | 8.0 | 6.0 | 6.0 | 4.0 | 7.0 | 8.0 | 8.0 |
| $SiO_2/Al_2O_3$ | 6.8 | 6.8 | 6.8 | 6.2 | 6.8 | 6.8 | 6.8 | 6.0 | 5.4 | 5.5 |
| $(SiO_2+Al_2O_3)/R_2O$ | 9.8 | 9.8 | 9.8 | 9.9 | 13.0 | 13.0 | 19.5 | 11.0 | 9.6 | 9.8 |
| $3*MgO + 6*Al_2O_3 - 0.4*CaO + 0.4*Na_2O - SiO_2$ | 30 | 24 | 13 | 33 | 19 | 12 | 17 | 30 | 38 | 21 |
| $SiO_2 + 2*Al_2O_3 + 0.8*RO - 0.5*R_2O$ | 95 | 95 | 95 | 96 | 98 | 98 | 100 | 97 | 97 | 97 |
| $SiO_2 + Al_2O_3$ | 78.0 | 78.0 | 78.0 | 79.0 | 78.0 | 78.0 | 78.0 | 77.0 | 77.0 | 78.0 |
| MgO/RO | 0.86 | 0.71 | 0.50 | 0.85 | 0.56 | 0.44 | 0.50 | 0.63 | 0.67 | 0.36 |
| $T_g$ | 706 | 691 | 689 | 709 | 707 | 708 | 726 | 708 | 704 | 698 |
| Acid resistance | 0.013 | 0.013 | 0.013 | 0.017 | 0.009 | 0.01* | 0.01* | 0.02 | 0.03 | 0.02 |
| Alkali resistance | 0.652 | 0.622 | 0.606 | 0.703 | 0.568 | 0.510* | 0.432* | 0.77 | 0.83 | 0.81 |
| $T_L$ | 1300< | 1270-1280 | 1250> | 1300< | 1200-1240 | <1190 | <1193 | 1214-1240 | 1240-1267 | 1190-1228 |
| d | 2.46* | 2.47* | 2.48* | 2.45* | 2.49 | 2.49* | 2.50* | 2.49* | 2.48* | 2.49* |
| E | 80* | 79* | 79* | 79* | 83 | 80* | 82* | 83 | 82 | 81* |
| E/d | 32.3* | 32.1* | 31.8* | 32.3* | 33.3 | 32.3* | 33.0* | 33.3* | 33.1* | 32.5* |
| α | 55 | 59 | 56 | 53 | 52 | 57 | 67 | 69 | 59 | 58 |
| $T_2$ | 1728* | 1719* | 1709* | 1763* | 1680 | 1711* | 1721* | 1704* | 1732* | 1693 |
| $T_4$ | 1265* | 1256* | 1246* | 1291* | 1273 | 1255* | 1272* | 1258* | 1281* | 1274 |

TABLE 2

| | Example | | | | | | | | | |
|---|---|---|---|---|---|---|---|---|---|---|
| | 11 | 12 | 13 | 14 | 15 | 16 | 17 | 18 | 19 | 20 |
| $SiO_2$ | 66 | 68 | 66.8 | 64 | 67.8 | 68.0 | 68.0 | 68.0 | 68.0 | 68.0 |
| $Al_2O_3$ | 12 | 10 | 12.6 | 14 | 6.5 | 8.0 | 8.0 | 9.0 | 9.0 | 7.0 |
| $B_2O_3$ | 0 | 0 | 2.5 | 0 | 0 | 0 | 0 | 0 | 0 | 0 |
| MgO | 5 | 8 | 8.4 | 9 | 5.1 | 9.0 | 9.0 | 9.0 | 9.0 | 9.0 |
| CaO | 9 | 0 | 5.2 | 0 | 6.7 | 7.0 | 7.0 | 7.0 | 7.0 | 7.0 |
| SrO | 0 | 0 | 4.5 | 0 | 0 | 0 | 0 | 0 | 0 | 0 |
| BaO | 0 | 0 | 0 | 0 | 0 | 0 | 0 | 0 | 0 | 0 |
| $ZrO_2$ | 0 | 0 | 0 | 0 | 0 | 2.0 | 0 | 1.0 | 0 | 1.0 |
| $Li_2O$ | 0 | 0 | 0 | 0 | 0 | 0 | 0 | 0 | 0 | 0 |
| $Na_2O$ | 6 | 14 | 0 | 13 | 14.0 | 6.0 | 6.0 | 6.0 | 6.0 | 6.0 |
| $K_2O$ | 2 | 0 | 0 | 0 | 0 | 0 | 0 | 0 | 0 | 0 |
| $TiO_2$ | 0 | 0 | 0 | 0 | 0 | 0 | 2.0 | 0 | 1.0 | 2.0 |
| RO | 14.0 | 8.0 | 18.1 | 9.0 | 11.8 | 16.0 | 16.0 | 16.0 | 16.0 | 16.0 |
| $R_2O$ | 8.0 | 14.0 | 0.0 | 13.0 | 14.0 | 6.0 | 6.0 | 6.0 | 6.0 | 6.0 |
| $SiO_2/Al_2O_3$ | 5.5 | 6.8 | 5.3 | 4.6 | 10.5 | 8.5 | 8.5 | 7.6 | 7.6 | 9.7 |
| $(SiO_2 + Al_2O_3)/R_2O$ | 9.8 | 5.6 | 0.0 | 6.0 | 5.3 | 12.7 | 12.7 | 12.8 | 12.8 | 12.5 |
| $3*MgO + 6*Al_2O_3 - 0.4*CaO + 0.4*Na_2O - SiO_2$ | 20 | 22 | 32 | 52 | -11 | 7 | 7 | 13 | 13 | 1 |
| $SiO_2 + 2*Al_2O_3 + 0.8*RO - 0.5*R_2O$ | 97 | 87 | 106 | 93 | 83 | 94 | 94 | 96 | 96 | 92 |
| $SiO_2 + Al_2O_3$ | 78.0 | 78.0 | 79.4 | 78.0 | 74.3 | 76.0 | 76.0 | 77.0 | 77.0 | 75.0 |
| MgO/RO | 0.36 | 1.00 | 0.46 | 1.00 | 0.43 | 0.56 | 0.56 | 0.56 | 0.56 | 0.56 |
| $T_g$ | 698 | 663 | 767 | 702 | 590 | 716 | 704 | 709 | 705 | 704 |
| Acid resistance | 0.03 | 0.03* | 0.02 | 0.14 | 0.10* | 0.005* | 0.003 | 0.007* | 0.004 | 0.003 |
| Alkali resistance | 0.85 | 0.929* | 1.15 | 0.98 | 0.86* | 0.1* | 0.26 | 0.31* | 0.30 | 0.29 |
| $T_L$ | <1190 | 1291 | ~1250 | 1291 | — | — | 1200-1222 | — | <1250 | 1196-1211 |
| d | 2.49* | 2.44 | 2.59 | 2.46 | 2.49* | 2.54 | 2.50 | 2.52 | 2.50 | 2.53 |
| E | 80 | 72 | 84 | 78 | 75* | 84* | 82 | 84 | 82 | 83 |
| E/d | 32.1* | 29.6 | 32.0 | 31.5 | 30.2* | 33.2 | 32.8 | 33.3 | 32.9 | 32.8 |
| α | 69* | 79 | 39 | 75 | 86* | 53* | 54 | 53* | 55 | 56 |
| $T_2$ | 1737* | 1716 | 1654 | 1747* | 1566* | 1677* | 1633 | 1698* | 1695* | 1618 |
| $T_4$ | 1274* | 1263 | 1295 | 1274* | 1117* | 1248* | 1227 | 1256* | 1244* | 1219 |

TABLE 3

| | Example | | | | | | | | | |
|---|---|---|---|---|---|---|---|---|---|---|
| | 21 | 22 | 23 | 24 | 25 | 26 | 27 | 28 | 29 | 30 |
| $SiO_2$ | 68.0 | 67.0 | 66.1 | 69.4 | 68.0 | 68.0 | 68.0 | 68.0 | 68.0 | 69.6 |
| $Al_2O_3$ | 10.5 | 11.0 | 10.6 | 7.8 | 7.0 | 7.0 | 10.0 | 8.1 | 7.9 | 7.0 |
| $B_2O_3$ | 0.0 | 0.0 | 0.0 | 0.0 | 0.0 | 0.0 | 0.0 | 0.0 | 0.0 | 0.0 |
| MgO | 8.5 | 7.0 | 11.0 | 6.3 | 7.0 | 7.0 | 7.0 | 9.0 | 9.0 | 9.0 |
| CaO | 6.0 | 8.0 | 1.5 | 2.7 | 9.0 | 9.0 | 8.0 | 4.9 | 5.9 | 6.2 |
| SrO | 0.0 | 0.0 | 0.0 | 0.0 | 0.0 | 0.0 | 1.0 | 0.0 | 0.0 | 0.0 |
| BaO | 0.0 | 0.0 | 0.0 | 0.0 | 0.0 | 0.0 | 0.0 | 0.0 | 0.0 | 0.0 |
| $ZrO_2$ | 0.0 | 0.0 | 2.1 | 2.6 | 1.0 | 0.5 | 0.0 | 1.0 | 1.5 | 1.7 |
| $Li_2O$ | 0.0 | 0.0 | 0.0 | 0.0 | 0.0 | 0.0 | 0.0 | 0.0 | 0.0 | 0.0 |
| $Na_2O$ | 7.0 | 7.0 | 6.8 | 10.2 | 6.0 | 6.0 | 6.0 | 8.0 | 7.7 | 6.6 |
| $K_2O$ | 0.0 | 0.0 | 1.9 | 1.0 | 0.0 | 0.0 | 0.0 | 0.0 | 0.0 | 0.0 |
| $TiO_2$ | 0.0 | 0.0 | 0.0 | 0.0 | 2.0 | 2.5 | 0.0 | 1.0 | 0.0 | 0.0 |
| RO | 14.5 | 15.0 | 12.5 | 9.0 | 16.0 | 16.0 | 16.0 | 13.9 | 14.9 | 15.2 |
| $R_2O$ | 7.0 | 7.0 | 8.7 | 11.2 | 6.0 | 6.0 | 6.0 | 8.0 | 7.7 | 6.6 |
| $SiO_2/Al_2O_3$ | 6.5 | 6.1 | 6.2 | 8.9 | 9.7 | 9.7 | 6.8 | 8.4 | 8.6 | 9.9 |
| $(SiO_2 + Al_2O_3)/R_2O$ | 11.2 | 11.1 | 8.8 | 6.9 | 12.5 | 12.5 | 13.0 | 9.5 | 9.9 | 11.6 |
| $3*MgO + 6*Al_2O_3 - 0.4*CaO + 0.4*Na_2O - SiO_2$ | 21 | 20 | 33 | -1 | -6 | -6 | 12 | 9 | 7 | 0 |
| $SiO_2 + 2*Al_2O_3 + 0.8*RO - 0.5*R_2O$ | 97 | 98 | 93 | 87 | 92 | 92 | 98 | 91 | 92 | 92 |
| $SiO_2 + Al_2O_3$ | 78.5 | 78.0 | 76.7 | 77.2 | 75.0 | 75.0 | 78.0 | 76.1 | 75.9 | 76.6 |
| MgO/RO | 0.59 | 0.47 | 0.88 | 0.70 | 0.44 | 0.44 | 0.44 | 0.65 | 0.60 | 0.59 |
| $T_g$ | 703 | 706 | 722 | 686 | 696 | 697 | 701 | 691 | 693 | 703 |
| Acid resistance | 0.007* | 0.012* | 0.002 | 0.002 | 0.002 | 0.004 | 0.010 | 0.001 | 0.004 | 0.004 |
| Alkali resistance | 0.58* | 0.58* | 0.22 | 0.09 | 0.28 | 0.33 | 0.80 | 0.26 | 0.19 | 0.17 |
| $T_L$ | — | — | — | — | 1196-1211 | 1199-1210 | — | <1210 | 1239-1249 | 1261 |
| d | 2.47* | 2.49* | 2.52 | 2.51 | 2.54 | 2.53 | 2.52 | 2.51 | 2.52 | 2.52 |
| E | 80* | 81* | 83.9 | 79.8 | 83 | 82 | 70 | 81 | 82 | 82 |
| E/d | 32.4* | 32.5* | 33.3 | 31.8 | 32.5 | 32.4 | 27.7 | 32.2 | 32.5 | 32.7 |
| α | 57* | 62* | 60 | 66 | 56 | 59 | 61* | 57* | 59* | 51* |
| $T_2$ | 1735* | 1718* | 1746* | 1713* | 1640* | 1638* | 1709* | 1651 | 1641 | 1680* |
| $T_4$ | 1271* | 1260* | 1302* | 1251* | 1207* | 1202* | 1254* | 1240 | 1238 | 1238* |

TABLE 4

| | Example | | | | | | | | | |
|---|---|---|---|---|---|---|---|---|---|---|
| | 31 | 32 | 33 | 34 | 35 | 36 | 37 | 38 | 39 | 40 |
| $SiO_2$ | 68.0 | 64.3 | 70.0 | 68.4 | 68.7 | 70.0 | 69.1 | 66.0 | 72.9 | 68.0 |
| $Al_2O_3$ | 7.9 | 12.0 | 8.7 | 10.6 | 9.4 | 8.5 | 9.5 | 12.0 | 6.1 | 6.0 |
| $B_2O_3$ | 0.0 | 0.0 | 0.0 | 0.0 | 0.0 | 0.0 | 0.0 | 0.0 | 0.0 | 0.0 |
| MgO | 7.0 | 9.0 | 6.4 | 3.5 | 3.5 | 5.0 | 3.5 | 4.5 | 0.0 | 9.0 |
| CaO | 7.9 | 5.2 | 8.3 | 9.3 | 10.9 | 10.0 | 10.5 | 11.0 | 10.9 | 7.0 |
| SrO | 0.0 | 0.0 | 0.0 | 0.0 | 0.0 | 0.0 | 0.0 | 0.0 | 0.0 | 0.0 |
| BaO | 0.0 | 0.0 | 0.0 | 0.0 | 0.0 | 0.0 | 0.0 | 0.0 | 0.0 | 0.0 |
| $ZrO_2$ | 1.5 | 0.7 | 1.0 | 1.0 | 1.0 | 1.0 | 1.0 | 0.0 | 3.0 | 0.0 |
| $Li_2O$ | 0.0 | 0.0 | 0.0 | 0.0 | 0.0 | 0.0 | 0.0 | 0.0 | 0.0 | 0.0 |
| $Na_2O$ | 7.7 | 8.8 | 5.6 | 7.2 | 6.5 | 5.5 | 6.4 | 6.5 | 3.0 | 6.0 |
| $K_2O$ | 0.0 | 0.0 | 0.0 | 0.0 | 0.0 | 0.0 | 0.0 | 0.0 | 4.0 | 0.0 |
| $TiO_2$ | 0.0 | 0.0 | 0.0 | 0.0 | 0.0 | 0.0 | 0.0 | 0.0 | 0.0 | 4.0 |
| RO | 14.9 | 14.2 | 14.7 | 12.8 | 14.4 | 15.0 | 14.0 | 15.5 | 10.9 | 16.0 |
| $R_2O$ | 7.7 | 8.8 | 5.6 | 7.2 | 6.5 | 5.5 | 6.4 | 6.5 | 7.1 | 6.0 |
| $SiO_2/Al_2O_3$ | 8.6 | 5.4 | 8.1 | 6.4 | 7.3 | 8.3 | 7.2 | 5.5 | 12.0 | 11.3 |
| $(SiO_2 + Al_2O_3)/R_2O$ | 9.9 | 8.7 | 14.1 | 11.0 | 12.0 | 14.3 | 12.3 | 12.0 | 11.2 | 12.3 |
| $3*MgO + 6*Al_2O_3 - 0.4*CaO + 0.4*Na_2O - SiO_2$ | 0 | 36 | 0 | 5 | -4 | -6 | -3 | 18 | -40 | -5 |
| $SiO_2 + 2*Al_2O_3 + 0.8*RO - 0.5*R_2O$ | 92 | 95 | 96 | 96 | 96 | 96 | 96 | 99 | 90 | 90 |
| $SiO_2 + Al_2O_3$ | 75.9 | 76.3 | 78.7 | 79.0 | 78.1 | 78.5 | 78.6 | 78.0 | 79.0 | 74.0 |
| MgO/RO | 0.47 | 0.63 | 0.44 | 0.27 | 0.24 | 0.33 | 0.25 | 0.29 | 0.00 | 0.56 |
| $T_g$ | 692 | 701 | 719 | 716 | 710 | 717 | 711 | 707* | 739 | 702 |
| Acid resistance | 0.004* | 0.002* | 0.003* | 0.005 | 0.003 | 0.002 | 0.003* | 0.010* | 0.002 | 0.013 |
| Alkali resistance | 0.23* | 0.58* | 0.22* | 0.28 | 0.30 | 0.32 | 0.25* | 0.55* | 0.08 | 0.43 |
| $T_L$ | 1150-1200 | 1216 | 1230 | 1185 | 1163 | 1190 | — | — | — | — |
| d | 2.53 | 2.49 | 2.51 | 2.51 | 2.51 | 2.51 | 2.51* | 2.50* | 2.53 | 2.54 |
| E | 82 | 81 | 82 | 81 | 81 | 82 | 79* | 82* | 79.7 | 81 |
| E/d | 32.4 | 32.6 | 32.9 | 32.3 | 32.3 | 32.8 | 31.5* | 32.8* | 31.5 | 31.8 |
| α | 61* | 68* | 49* | 57* | 58* | 51* | 56* | 65* | 60 | 59 |
| $T_2$ | 1656* | 1697* | 1731* | 1691 | 1707* | 1718* | 1722* | 1715* | 1761* | 1620* |
| $T_4$ | 1220* | 1256* | 1270* | 1281 | 1250* | 1259* | 1260* | 1260* | 1288* | 1186* |

TABLE 5

| | Example | | | | | | | | | |
|---|---|---|---|---|---|---|---|---|---|---|
| | 41 | 42 | 43 | 44 | 45 | 46 | 47 | 48 | 49 | 50 |
| $SiO_2$ | 68.0 | 64.1 | 68.7 | 68.7 | 70.5 | 64.0 | 70.0 | 67.0 | 66.5 | 66.0 |
| $Al_2O_3$ | 4.0 | 14.4 | 9.4 | 9.4 | 10.0 | 14.0 | 9.3 | 9.8 | 10.0 | 10.2 |
| $B_2O_3$ | 0.0 | 0.0 | 0.0 | 0.0 | 0.0 | 0.0 | 0.0 | 0.0 | 0.0 | 0.0 |
| MgO | 9.0 | 0.0 | 3.5 | 3.5 | 2.5 | 2.1 | 3.5 | 4.5 | 5.0 | 5.0 |
| CaO | 7.0 | 9.7 | 10.4 | 9.9 | 12.0 | 10.9 | 9.5 | 11.5 | 11.5 | 11.5 |
| SrO | 0.0 | 0.0 | 0.0 | 0.0 | 1.5 | 0.0 | 0.0 | 0.0 | 0.0 | 0.0 |
| BaO | 0.0 | 0.0 | 0.0 | 0.0 | 1.0 | 0.0 | 0.0 | 0.0 | 0.0 | 0.0 |
| $ZrO_2$ | 0.0 | 1.0 | 1.5 | 2.0 | 0.0 | 3.0 | 1.0 | 1.2 | 1.0 | 1.2 |
| $Li_2O$ | 0.0 | 0.0 | 0.0 | 0.0 | 2.0 | 0.0 | 0.0 | 0.0 | 0.0 | 0.0 |
| $Na_2O$ | 6.0 | 10.7 | 6.5 | 6.5 | 0.5 | 6.0 | 6.7 | 6.0 | 6.0 | 6.1 |
| $K_2O$ | 0.0 | 0.0 | 0.0 | 0.0 | 0.0 | 0.0 | 0.0 | 0.0 | 0.0 | 0.0 |
| $TiO_2$ | 6.0 | 0.0 | 0.0 | 0.0 | 0.0 | 0.0 | 0.0 | 0.0 | 0.0 | 0.0 |
| RO | 16.0 | 9.7 | 13.9 | 13.4 | 17.0 | 13.0 | 13.0 | 16.0 | 16.5 | 16.5 |
| $R_2O$ | 6.0 | 10.7 | 6.5 | 6.5 | 2.5 | 6.0 | 6.7 | 6.0 | 6.0 | 6.1 |
| $SiO_2/Al_2O_3$ | 17.0 | 4.4 | 7.3 | 7.3 | 7.1 | 4.6 | 7.5 | 6.8 | 6.7 | 6.5 |
| $(SiO_2 + Al_2O_3)/R_2O$ | 12.0 | 7.3 | 12.0 | 12.0 | 32.2 | 13.0 | 11.8 | 12.8 | 12.8 | 12.5 |
| $3*MgO + 6*Al_2O_3 - 0.4*CaO + 0.4*Na_2O - SiO_2$ | -17 | 23 | -3 | -3 | -8 | 24 | -5 | 3 | 6 | 8 |
| $SiO_2 + 2*Al_2O_3 + 0.8*RO - 0.5*R_2O$ | 86 | 95 | 95 | 95 | 103 | 99 | 96 | 96 | 97 | 97 |
| $SiO_2 + Al_2O_3$ | 72.0 | 78.5 | 78.1 | 78.1 | 80.5 | 78.0 | 79.3 | 76.8 | 76.5 | 76.2 |
| MgO/RO | 0.56 | 0.00 | 0.25 | 0.26 | 0.15 | 0.16 | 0.27 | 0.28 | 0.30 | 0.30 |
| $T_g$ | 687 | 723 | 708 | 709 | 750* | 725* | 702 | 700* | 700* | 701* |
| Acid resistance | 0.042 | 0.018 | 0.003* | 0.002* | 0.004* | 0.002* | 0.003* | 0.003* | 0.003* | 0.003* |
| Alkali resistance | 0.39 | 0.45 | 0.13* | 0.02* | 0.29* | 0.02* | 0.24* | 0.21* | 0.27* | 0.24* |
| $T_L$ | <1200 | 1200-1251 | — | — | — | — | — | — | — | — |
| d | 2.52 | 2.53 | 2.53* | 2.53* | 2.54* | 2.57* | 2.50* | 2.54* | 2.54* | 2.55* |
| E | 82 | 80 | 80* | 81* | 84* | 87* | 81* | 83* | 84* | 85* |
| E/d | 32.7 | 31.6 | 31.6* | 32.0* | 33.1* | 33.6* | 32.6* | 32.8* | 33.0* | 33.2* |
| α | 59 | 74* | 55* | 53* | 53* | 55* | 53* | 61* | 63* | 63* |
| $T_2$ | 1570* | 1687 | 1714* | 1721* | 1750* | 1763* | 1739* | 1681* | 1674* | 1670* |
| $T_4$ | 1146* | 1284 | 1259* | 1268* | 1281* | 1325* | 1268* | 1243* | 1238* | 1238* |

TABLE 6

| | Example | | | | | | | | | |
|---|---|---|---|---|---|---|---|---|---|---|
| | 51 | 52 | 53 | 54 | 55 | 56 | 57 | 58 | 59 | 60 |
| $SiO_2$ | 64.0 | 65.5 | 65.0 | 65.0 | 65.3 | 65.0 | 64.6 | 65.2 | 64.5 | 67.0 |
| $Al_2O_3$ | 10.8 | 10.7 | 10.7 | 10.7 | 10.7 | 11.7 | 12.5 | 12.0 | 12.5 | 8.5 |
| $B_2O_3$ | 0.0 | 0.0 | 0.0 | 0.0 | 0.0 | 0.0 | 0.0 | 0.0 | 0.0 | 0.0 |
| MgO | 5.5 | 5.0 | 5.0 | 4.5 | 4.5 | 4.0 | 4.5 | 5.0 | 5.5 | 4.5 |
| CaO | 11.5 | 11.0 | 11.0 | 11.5 | 11.5 | 11.5 | 10.2 | 10.0 | 9.5 | 12.0 |
| SrO | 0.0 | 0.0 | 0.0 | 0.0 | 0.0 | 0.0 | 0.0 | 0.0 | 0.0 | 0.0 |
| BaO | 0.0 | 0.0 | 0.0 | 0.0 | 0.0 | 0.0 | 0.0 | 0.0 | 0.0 | 0.0 |
| $ZrO_2$ | 1.2 | 1.2 | 1.2 | 1.2 | 1.2 | 1.4 | 1.4 | 1.4 | 1.2 | 1.2 |
| $Li_2O$ | 0.0 | 0.0 | 0.0 | 0.0 | 0.0 | 0.0 | 0.0 | 0.0 | 0.0 | 0.0 |
| $Na_2O$ | 7.0 | 6.6 | 7.1 | 7.1 | 6.8 | 6.4 | 6.8 | 6.4 | 6.8 | 6.8 |
| $K_2O$ | 0.0 | 0.0 | 0.0 | 0.0 | 0.0 | 0.0 | 0.0 | 0.0 | 0.0 | 0.0 |
| $TiO_2$ | 0.0 | 0.0 | 0.0 | 0.0 | 0.0 | 0.0 | 0.0 | 0.0 | 0.0 | 0.0 |
| RO | 17.0 | 16.0 | 16.0 | 16.0 | 16.0 | 15.5 | 14.7 | 15.0 | 15.0 | 16.5 |
| $R_2O$ | 7.0 | 6.6 | 7.1 | 7.1 | 6.8 | 6.4 | 6.8 | 6.4 | 6.8 | 6.8 |
| $SiO_2/Al_2O_3$ | 5.9 | 6.1 | 6.1 | 6.1 | 6.1 | 5.6 | 5.2 | 5.4 | 5.2 | 7.9 |
| $(SiO_2 + Al_2O_3)/R_2O$ | 10.7 | 11.5 | 10.7 | 10.7 | 11.2 | 12.0 | 11.3 | 12.1 | 11.3 | 11.1 |
| $3*MgO + 6*Al_2O_3 - 0.4*CaO + 0.4*Na_2O - SiO_2$ | 16 | 12 | 13 | 11 | 11 | 15 | 23 | 20 | 26 | -5 |
| $SiO_2 + 2*Al_2O_3 + 0.8*RO - 0.5*R_2O$ | 96 | 96 | 96 | 96 | 96 | 98 | 98 | 98 | 98 | 94 |
| $SiO_2 + Al_2O_3$ | 74.8 | 76.2 | 75.7 | 75.7 | 76.0 | 76.7 | 77.1 | 77.2 | 77.0 | 75.5 |
| MgO/RO | 0.32 | 0.31 | 0.31 | 0.28 | 0.28 | 0.26 | 0.31 | 0.33 | 0.37 | 0.27 |
| $T_g$ | 697* | 699* | 696* | 697* | 699* | 709* | 708* | 708* | 707* | 686* |
| Acid resistance | 0.003* | 0.003* | 0.003* | 0.003* | 0.003* | 0.003* | 0.003* | 0.003* | 0.003* | 0.003* |
| Alkali resistance | 0.32* | 0.28* | 0.31* | 0.30* | 0.28* | 0.22* | 0.26* | 0.23* | 0.32* | 0.24* |
| $T_L$ | — | — | — | — | — | — | — | — | — | — |
| d | 2.56* | 2.55* | 2.55* | 2.55* | 2.55* | 2.55* | 2.54* | 2.54* | 2.53* | 2.55* |
| E | 86* | 85* | 85* | 85* | 85* | 85* | 85* | 85* | 85* | 83* |
| E/d | 33.7* | 33.2* | 33.2* | 33.2* | 33.1* | 33.3* | 33.3* | 33.3* | 33.4* | 32.6* |
| α | 71* | 65* | 68* | 68* | 67* | 64* | 63* | 61* | 64* | 66* |
| $T_2$ | 1638* | 1674* | 1660* | 1657* | 1666* | 1694* | 1713* | 1715* | 1712* | 1635* |
| $T_4$ | 1220* | 1241* | 1231* | 1228* | 1235* | 1259* | 1274* | 1275* | 1273* | 1205* |

TABLE 7

| | Example | | | | | | | | | |
|---|---|---|---|---|---|---|---|---|---|---|
| | 61 | 62 | 63 | 64 | 65 | 66 | 67 | 68 | 69 | 70 |
| $SiO_2$ | 64.5 | 65.0 | 66.5 | 66.5 | 70.4 | 71.0 | 69.2 | 70.4 | 70.4 | 71.3 |
| $Al_2O_3$ | 10.5 | 8.7 | 9.5 | 9.5 | 11.7 | 11.6 | 11.0 | 10.1 | 9.7 | 9.7 |
| $B_2O_3$ | 0.0 | 0.0 | 0.0 | 0.0 | 0.0 | 0.0 | 0.0 | 0.0 | 0.0 | 0.0 |
| MgO | 5.0 | 5.5 | 3.0 | 5.0 | 3.5 | 4.0 | 4.5 | 3.0 | 3.5 | 2.5 |
| CaO | 12.0 | 11.5 | 9.5 | 7.5 | 7.0 | 6.5 | 8.0 | 8.5 | 9.0 | 9.0 |
| SrO | 0.0 | 1.0 | 2.2 | 2.2 | 0.0 | 0.0 | 0.0 | 0.0 | 0.0 | 0.0 |
| BaO | 0.0 | 0.0 | 0.2 | 0.2 | 0.0 | 0.0 | 0.0 | 0.0 | 0.0 | 0.0 |
| $ZrO_2$ | 1.2 | 1.5 | 1.8 | 1.8 | 0.6 | 0.7 | 0.5 | 0.8 | 0.6 | 1.2 |
| $Li_2O$ | 0.0 | 0.0 | 0.0 | 0.0 | 0.0 | 0.0 | 0.0 | 0.0 | 0.0 | 0.0 |
| $Na_2O$ | 6.8 | 6.8 | 5.3 | 5.5 | 6.8 | 6.2 | 6.8 | 7.2 | 6.8 | 6.3 |
| $K_2O$ | 0.0 | 0.0 | 1.5 | 1.0 | 0.0 | 0.0 | 0.0 | 0.0 | 0.0 | 0.0 |
| $TiO_2$ | 0.0 | 0.0 | 0.5 | 0.8 | 0.0 | 0.0 | 0.0 | 0.0 | 0.0 | 0.0 |
| RO | 17.0 | 18.0 | 14.9 | 14.9 | 10.5 | 10.5 | 12.5 | 11.5 | 12.5 | 11.5 |
| $R_2O$ | 6.8 | 6.8 | 6.8 | 6.5 | 6.8 | 6.2 | 6.8 | 7.2 | 6.8 | 6.3 |
| $SiO_2/Al_2O_3$ | 6.1 | 7.5 | 7.0 | 7.0 | 6.0 | 6.1 | 6.3 | 7.0 | 7.3 | 7.4 |
| $(SiO_2 + Al_2O_3)/R_2O$ | 11.0 | 10.8 | 11.2 | 11.7 | 12.1 | 13.3 | 11.8 | 11.2 | 11.8 | 12.9 |
| $3*MgO + 6*Al_2O_3 - 0.4*CaO + 0.4*Na_2O - SiO_2$ | 11 | 2 | -2 | 5 | 10 | 10 | 10 | -1 | -3 | -7 |
| $SiO_2 + 2*Al_2O_3 + 0.8*RO - 0.5*R_2O$ | 96 | 93 | 94 | 94 | 99 | 100 | 98 | 96 | 96 | 97 |
| $SiO_2 + Al_2O_3$ | 75.0 | 73.7 | 76.0 | 76.0 | 82.1 | 82.6 | 80.2 | 80.5 | 80.1 | 81.0 |
| MgO/RO | 0.29 | 0.31 | 0.20 | 0.34 | 0.33 | 0.38 | 0.36 | 0.26 | 0.28 | 0.22 |
| $T_g$ | 698* | 686* | 691* | 691* | 699* | 703* | 696* | 688* | 689* | 693* |
| Acid resistance | 0.003* | 0.003* | 0.003* | 0.003* | 0.005* | 0.005* | 0.005* | 0.005* | 0.005* | 0.003* |
| Alkali resistance | 0.30* | 0.23* | 0.67* | 1.04* | 0.36* | 0.30* | 0.40* | 0.31* | 0.34* | 0.15* |
| $T_L$ | — | — | — | — | — | — | — | — | — | — |
| d | 2.56* | 2.58* | 2.54* | 2.53* | 2.45* | 2.45* | 2.48* | 2.48* | 2.48* | 2.48* |
| E | 86* | 86* | 81* | 82* | 75* | 75* | 77* | 76* | 76* | 76* |
| E/d | 33.6* | 33.4* | 32.0* | 32.3* | 30.6* | 30.6* | 31.3* | 30.6* | 30.8* | 30.6* |
| α | 70* | 74* | 70* | 66* | 46* | 42* | 53* | 51* | 52* | 46* |
| $T_2$ | 1639* | 1594* | 1679* | 1686* | 1830* | 1847* | 1775* | 1773* | 1758* | 1788* |
| $T_4$ | 1218* | 1187* | 1245* | 1253* | 1330* | 1344* | 1295* | 1288* | 1278* | 1301* |

TABLE 8

| | Example | | | | | | | | | |
|---|---|---|---|---|---|---|---|---|---|---|
| | 71 | 72 | 73 | 74 | 75 | 76 | 77 | 78 | 79 | 80 |
| $SiO_2$ | 72.7 | 71.9 | 70.6 | 71.3 | 68.0 | 69.0 | 66.9 | 68.3 | 67.0 | 69.2 |
| $Al_2O_3$ | 8.8 | 7.5 | 10.5 | 7.0 | 12.5 | 11.5 | 12.5 | 12.7 | 11.0 | 8.9 |
| $B_2O_3$ | 0.0 | 0.0 | 0.0 | 0.0 | 0.0 | 0.0 | 0.0 | 0.0 | 0.0 | 0.0 |
| MgO | 2.0 | 3.5 | 2.0 | 2.0 | 1.5 | 1.0 | 1.5 | 0.5 | 3.0 | 3.5 |
| CaO | 7.7 | 9.5 | 8.0 | 11.5 | 10.0 | 10.7 | 11.5 | 10.5 | 11.5 | 10.9 |
| SrO | 0.0 | 0.0 | 0.0 | 0.0 | 0.0 | 0.0 | 0.0 | 0.0 | 0.0 | 0.0 |
| BaO | 0.0 | 0.0 | 0.0 | 0.0 | 0.0 | 0.0 | 0.0 | 0.0 | 0.0 | 0.0 |
| $ZrO_2$ | 1.8 | 1.5 | 1.4 | 1.4 | 1.2 | 1.4 | 1.3 | 1.5 | 1.2 | 1.0 |
| $Li_2O$ | 0.0 | 0.0 | 0.0 | 0.0 | 0.0 | 0.0 | 0.0 | 0.0 | 0.0 | 0.0 |
| $Na_2O$ | 6.2 | 6.1 | 7.5 | 6.8 | 6.8 | 6.4 | 6.3 | 6.5 | 6.3 | 6.5 |
| $K_2O$ | 0.8 | 0.0 | 0.0 | 0.0 | 0.0 | 0.0 | 0.0 | 0.0 | 0.0 | 0.0 |
| $TiO_2$ | 0.0 | 0.0 | 0.0 | 0.0 | 0.0 | 0.0 | 0.0 | 0.0 | 0.0 | 0.0 |
| RO | 9.7 | 13.0 | 10.0 | 13.5 | 11.5 | 11.7 | 13.0 | 11.0 | 14.5 | 14.4 |
| $R_2O$ | 7.0 | 6.1 | 7.5 | 6.8 | 6.8 | 6.4 | 6.3 | 6.5 | 6.3 | 6.5 |
| $SiO_2/Al_2O_3$ | 8.3 | 9.6 | 6.7 | 10.2 | 5.4 | 6.0 | 5.4 | 5.4 | 6.1 | 7.8 |
| $(SiO_2 + Al_2O_3)/R_2O$ | 11.6 | 13.0 | 10.8 | 11.5 | 11.8 | 12.6 | 12.6 | 12.5 | 12.4 | 12.0 |
| $3*MgO + 6*Al_2O_3 - 0.4*CaO + 0.4*Na_2O - SiO_2$ | -15 | -18 | -2 | -25 | 10 | 1 | 11 | 8 | 6 | -7 |
| $SiO_2 + 2*Al_2O_3 + 0.8*RO - 0.5*R_2O$ | 95 | 94 | 96 | 93 | 99 | 98 | 99 | 99 | 97 | 95 |
| $SiO_2 + Al_2O_3$ | 81.5 | 79.4 | 81.1 | 78.3 | 80.5 | 80.5 | 79.4 | 81.0 | 78.0 | 78.1 |
| MgO/RO | 0.21 | 0.27 | 0.20 | 0.15 | 0.13 | 0.09 | 0.12 | 0.05 | 0.21 | 0.24 |
| $T_g$ | 681* | 683* | 688* | 680* | 709* | 708* | 716* | 714* | 706* | 690* |
| Acid resistance | 0.002* | 0.003* | 0.003* | 0.003* | 0.003* | 0.003* | 0.003* | 0.003* | 0.003* | 0.003* |
| Alkali resistance | 0.02* | 0.06* | 0.18* | 0.10* | 0.23* | 0.14* | 0.19* | 0.13* | 0.22* | 0.24* |
| $T_L$ | — | — | — | — | — | — | — | — | — | — |
| d | 2.48* | 2.51* | 2.48* | 2.52* | 2.50* | 2.50* | 2.52* | 2.50* | 2.53* | 2.52* |
| E | 74* | 77* | 75* | 77* | 78* | 78* | 81* | 78* | 82* | 80* |
| E/d | 29.9* | 30.8* | 30.3* | 30.7* | 31.4* | 31.2* | 32.1* | 31.3* | 32.4* | 31.6* |
| α | 42* | 47* | 48* | 54* | 54* | 51* | 57* | 51* | 59* | 57* |
| $T_2$ | 1809* | 1735* | 1797* | 1692* | 1791* | 1784* | 1762* | 1806* | 1717* | 1703* |
| $T_4$ | 1313* | 1264* | 1307* | 1229* | 1313* | 1306* | 1298* | 1325* | 1266* | 1245* |

TABLE 9

| | Example | | | | | | | | | |
|---|---|---|---|---|---|---|---|---|---|---|
| | 81 | 82 | 83 | 84 | 85 | 86 | 87 | 88 | 89 | 90 |
| $SiO_2$ | 68.7 | 68.6 | 68.1 | 68.7 | 68.0 | 68.5 | 68.8 | 69.7 | 72.4 | 72.4 |
| $Al_2O_3$ | 9.4 | 8.9 | 10.0 | 12.5 | 12.5 | 12.0 | 11.5 | 12.5 | 10.5 | 11.0 |
| $B_2O_3$ | 0.0 | 0.0 | 0.0 | 0.0 | 0.0 | 0.0 | 0.0 | 0.0 | 0.0 | 0.0 |
| MgO | 3.0 | 3.5 | 3.3 | 6.5 | 6.5 | 6.5 | 6.5 | 5.5 | 4.5 | 5.0 |
| CaO | 11.4 | 10.9 | 11.5 | 3.0 | 4.0 | 5.0 | 5.5 | 6.0 | 3.8 | 3.3 |
| SrO | 0.0 | 0.0 | 0.0 | 0.0 | 0.0 | 0.0 | 0.0 | 0.0 | 0.0 | 0.0 |
| BaO | 0.0 | 0.0 | 0.0 | 0.0 | 0.0 | 0.0 | 0.0 | 0.0 | 0.0 | 0.0 |
| $ZrO_2$ | 1.0 | 1.3 | 0.8 | 0.3 | 0.8 | 1.1 | 1.2 | 0.3 | 0.6 | 0.5 |
| $Li_2O$ | 0.0 | 0.0 | 0.0 | 0.0 | 0.0 | 0.0 | 0.0 | 0.0 | 0.0 | 0.0 |
| $Na_2O$ | 6.5 | 6.8 | 6.3 | 9.0 | 8.0 | 6.9 | 6.5 | 6.0 | 8.2 | 7.8 |
| $K_2O$ | 0.0 | 0.0 | 0.0 | 0.0 | 0.0 | 0.0 | 0.0 | 0.0 | 0.0 | 0.0 |
| $TiO_2$ | 0.0 | 0.0 | 0.0 | 0.0 | 0.0 | 0.0 | 0.0 | 0.0 | 0.0 | 0.0 |
| RO | 14.4 | 14.4 | 14.8 | 9.5 | 10.5 | 11.5 | 12.0 | 11.5 | 8.3 | 8.3 |
| $R_2O$ | 6.5 | 6.8 | 6.3 | 9.0 | 8.0 | 6.9 | 6.5 | 6.0 | 8.2 | 7.8 |
| $SiO_2/Al_2O_3$ | 7.3 | 7.7 | 6.8 | 5.5 | 5.4 | 5.7 | 6.0 | 5.6 | 6.9 | 6.6 |
| $(SiO_2 + Al_2O_3)/R_2O$ | 12.0 | 11.4 | 12.4 | 9.0 | 10.1 | 11.7 | 12.4 | 13.7 | 10.1 | 10.7 |
| $3*MgO + 6*Al_2O_3 - 0.4*CaO + 0.4*Na_2O - SiO_2$ | -5 | -6 | 0 | 28 | 28 | 24 | 20 | 22 | 6 | 10 |
| $SiO_2 + 2*Al_2O_3 + 0.8*RO - 0.5*R_2O$ | 96 | 95 | 97 | 97 | 97 | 98 | 98 | 101 | 96 | 97 |
| $SiO_2 + Al_2O_3$ | 78.1 | 77.5 | 78.1 | 81.2 | 80.5 | 80.5 | 80.3 | 82.2 | 82.9 | 83.4 |
| MgO/RO | 0.21 | 0.24 | 0.22 | 0.68 | 0.62 | 0.57 | 0.54 | 0.48 | 0.54 | 0.60 |
| $T_g$ | 695* | 688* | 699* | 693* | 701* | 705* | 705* | 712* | 681* | 689* |
| Acid resistance | 0.003* | 0.003* | 0.005* | 0.005* | 0.005* | 0.003* | 0.003* | 0.005* | 0.005* | 0.005* |
| Alkali resistance | 0.24* | 0.19* | 0.29* | 0.60* | 0.67* | 0.31* | 0.26* | 0.42* | 0.40* | 0.42* |
| $T_L$ | — | — | — | — | — | — | — | — | — | — |
| d | 2.52* | 2.53* | 2.52* | 2.44* | 2.46* | 2.47* | 2.48* | 2.44* | 2.43* | 2.42* |
| E | 80* | 80* | 81* | 75* | 78* | 79* | 79* | 77* | 71* | 72* |
| E/d | 31.7* | 31.8* | 32.0* | 30.8* | 31.5* | 31.8* | 31.9* | 31.3* | 29.4* | 29.6* |
| α | 58* | 59* | 59* | 54* | 53* | 48* | 47* | 45* | 43* | 41* |
| $T_2$ | 1704* | 1690* | 1708* | 1819* | 1810* | 1808* | 1801* | 1844* | 1846* | 1865* |
| $T_4$ | 1248* | 1239* | 1252* | 1323* | 1328* | 1329* | 1325* | 1347* | 1331* | 1346* |

TABLE 10

| | \multicolumn{7}{c}{Example} | | | | | | |
|---|---|---|---|---|---|---|---|
| | 91 | 92 | 93 | 94 | 95 | 96 | 97 | 98 |
| $SiO_2$ | 72.3 | 71.7 | 72.4 | 65.5 | 66.0 | 66.1 | 65.0 | 65.4 |
| $Al_2O_3$ | 11.5 | 10.5 | 10.5 | 8.8 | 8.3 | 8.8 | 9.3 | 7.8 |
| $B_2O_3$ | 0.0 | 0.0 | 0.0 | 0.0 | 0.0 | 0.0 | 0.0 | 0.0 |
| MgO | 4.0 | 4.5 | 4.5 | 5.6 | 5.7 | 6.0 | 5.5 | 5.9 |
| CaO | 3.8 | 4.5 | 3.8 | 12.0 | 11.7 | 11.5 | 11.3 | 12.0 |
| SrO | 0.0 | 0.0 | 0.0 | 0.0 | 0.0 | 0.0 | 0.7 | 1.0 |
| BaO | 0.0 | 0.0 | 0.0 | 0.0 | 0.0 | 0.0 | 0.0 | 0.2 |
| $ZrO_2$ | 0.4 | 0.6 | 0.6 | 0.7 | 1.2 | 0.4 | 0.7 | 1.0 |
| $Li_2O$ | 0.0 | 0.0 | 0.0 | 0.0 | 0.0 | 0.0 | 0.0 | 0.0 |
| $Na_2O$ | 8.0 | 8.2 | 8.2 | 7.4 | 7.1 | 7.2 | 7.5 | 6.7 |
| $K_2O$ | 0.0 | 0.0 | 0.0 | 0.0 | 0.0 | 0.0 | 0.0 | 0.0 |
| $TiO_2$ | 0.0 | 0.0 | 0.0 | 0.0 | 0.0 | 0.0 | 0.0 | 0.0 |
| RO | 7.8 | 9.0 | 8.3 | 17.6 | 17.4 | 17.5 | 17.5 | 19.1 |
| $R_2O$ | 8.0 | 8.2 | 8.2 | 7.4 | 7.1 | 7.2 | 7.5 | 6.7 |
| $SiO_2/Al_2O_3$ | 6.3 | 6.8 | 6.9 | 7.4 | 8.0 | 7.5 | 7.0 | 8.4 |
| $(SiO_2 + Al_2O_3)/R_2O$ | 10.5 | 10.0 | 10.1 | 10.0 | 10.5 | 10.4 | 9.9 | 10.9 |
| $3*MgO + 6*Al_2O_3 - 0.4*CaO + 0.4*Na_2O - SiO_2$ | 10 | 6 | 6 | 2 | −1 | 3 | 6 | −3 |
| $SiO_2 + 2*Al_2O_3 + 0.8*RO - 0.5*R_2O$ | 98 | 96 | 96 | 93 | 93 | 94 | 94 | 93 |
| $SiO_2 + Al_2O_3$ | 83.8 | 82.2 | 82.9 | 74.3 | 74.3 | 74.9 | 74.3 | 73.2 |
| MgO/RO | 0.51 | 0.50 | 0.54 | 0.32 | 0.33 | 0.34 | 0.31 | 0.31 |
| $T_g$ | 687* | 681* | 681* | 681* | 681* | 681* | 683* | 681* |
| Acid resistance | 0.005* | 0.005* | 0.005* | 0.005* | 0.003* | 0.005* | 0.005* | 0.003* |
| Alkali resistance | 0.44* | 0.41* | 0.40* | 0.43* | 0.28* | 0.48* | 0.45* | 0.33* |
| $T_L$ | — | — | — | — | — | — | — | — |
| d | 2.41* | 2.44* | 2.43* | 2.56* | 2.57* | 2.54* | 2.55* | 2.57* |
| E | 71* | 73* | 71* | 85* | 85* | 84* | 84* | 85* |
| E/d | 29.3* | 29.8* | 29.4* | 33.1* | 33.1* | 32.9* | 33.0* | 33.2* |
| α | 42* | 46* | 43* | 73* | 70* | 72* | 76* | 77* |
| $T_2$ | 1874* | 1827* | 1846* | 1601* | 1605* | 1616* | 1604* | 1570* |
| $T_4$ | 1350* | 1319* | 1331* | 1182* | 1188* | 1189* | 1185* | 1165* |

The present invention has been described in detail with reference to a specific mode, but it will be apparent to those skilled in the art that various changes and modifications can be made without departing from the spirit and scope of the present invention. The present application is based on Japanese Patent Application (No. 2015-197643) filed on Oct. 5, 2015, Japanese Patent Application (No. 2015-238570) filed on Dec. 7, 2015, Japanese Patent Application (No. 2016-067793) filed on Mar. 30, 2016, and Japanese Patent Application (No. 2016-193971) filed on Sep. 30, 2016, and the entirety of which is incorporated by reference. In addition, the entirety of all references cited herein is incorporated.

INDUSTRIAL APPLICABILITY

The glass for a data storage medium substrate of the present invention can be used for a data storage medium such as a magnetic disk or an optical disk, a substrate thereof, and manufacturing thereof.

The invention claimed is:

1. A glass comprising, in terms of mole percentage based on oxides:
   60% or more of $SiO_2$,
   more than 8.5% and less than 13% of $Al_2O_3$,
   0 to 5% of MgO,
   1 to 12% of CaO,
   0 to 2% of SrO,
   0 to 2% of BaO,
   0 to 1% of $TiO_2$,
   0% or more and less than 4% of $Li_2O$,
   3 to 12% of $Na_2O$,
   0% or more and less than 4% of $K_2O$,
   0% or more and less than 0.01% of $B_2O_3$, and
   0% or more and less than 0.01% of $ZrO_2$,
   wherein:
   a total content ($R_2O$) of $Li_2O$, $Na_2O$ and $K_2O$ is 3 to 12%,
   a total content of $SiO_2$ and $Al_2O_3$ is 80.5% or less,
   a molar ratio ($SiO_2/Al_2O_3$) of the $SiO_2$ content to the $Al_2O_3$ content is higher than 5,
   a molar ratio $[(SiO_2+Al_2O_3)/R_2O]$ of a total content $(SiO_2+Al_2O_3)$ of $SiO_2$ and $Al_2O_3$ to $R_2O$ is higher than 9, and
   contents of $SiO_2$, $Al_2O_3$, RO and $R_2O$ are such that a value obtained by the Formula (1) is greater than 90:

$$[SiO_2]+2\times[Al_2O_3]+0.8\times[RO]-0.5\times[R_2O] \quad \text{Formula (1)},$$

wherein in the Formula (1), RO represents a total content of MgO, CaO, SrO, and BaO.

2. The glass according to claim 1, comprising 0.1 to 1% of $TiO_2$.

3. The glass according to claim 1, comprising 4 to 12% of CaO.

4. The glass according to claim 1, comprising 7 to 12% of CaO.

5. The glass according to claim 1, comprising 0 to 4% of MgO.

6. The glass according to claim 1, comprising greater than 0% of $ZrO_2$.

7. The glass according to claim 1, wherein a molar ratio (MgO/RO) of MgO to a total content (RO) of MgO, CaO, SrO, and BaO is 0.7 or lower.

8. The glass according to claim 1, wherein the total content of $SiO_2$ and $Al_2O_3$ is 79.0% or less.

9. A glass comprising, in terms of mole percentage based on oxides:
   60% or more of $SiO_2$,
   more than 6.5% and less than 13% of $Al_2O_3$,
   0 to 5% of MgO, 1 to 12% of CaO,
0 to 2% of SrO,
0 to 2% of BaO,
0 to 1% of $TiO_2$,
0% or more and less than 4% of $Li_2O$,
3 to 12% of $Na_2O$,
0% or more and less than 4% of $K_2O$, and
0% or more and less than 0.01% of $B_2O_3$,
wherein:
a total content ($R_2O$) of $Li_2O$, $Na_2O$ and $K_2O$ is 3 to 12%,
a total content of $SiO_2$ and $Al_2O_3$ is 80.5% or less,
a molar ratio ($SiO_2/Al_2O_3$) of the $SiO_2$ content to the $Al_2O_3$ content is higher than 5,
a molar ratio $[(SiO_2+Al_2O_3)/R_2O]$ of a total content ($SiO_2+Al_2O_3$) of $SiO_2$ and $Al_2O_3$ to $R_2O$ is higher than 9, and
contents of $SiO_2$, $Al_2O_3$, RO and $R_2O$ are such that a value obtained by the Formula (1) is greater than 90:

$$[SiO_2]+2\times[Al_2O_3]+0.8\times[RO]-0.5\times[R_2O] \quad \text{Formula (1)},$$

wherein in the Formula (1), RO represents a total content of MgO, CaO, SrO, and BaO.

10. The glass according to claim 9, comprising 0.1 to 1% of $TiO_2$.

11. The glass according to claim 9, comprising 4 to 12% of CaO.

12. The glass according to claim 9, comprising 7 to 12% of CaO.

13. The glass according to claim 9, comprising 0 to 4% of MgO.

14. The glass according to claim 9, further comprising 0% or more of $ZrO_2$.

15. The glass according to claim 9, wherein contents of MgO, $Al_2O_3$, CaO, $Na_2O$ and $SiO_2$ are such that a value obtained by the Formula (2) is satisfied less than 30:

$$3\times[MgO]+6\times[Al_2O_3]-0.4\times[CaO]+0.4\times[Na_2O]-[SiO_2] \quad \text{Formula (2)}.$$

16. The glass according to claim 9, wherein a molar ratio (MgO/RO) of MgO to a total content (RO) of MgO, CaO, SrO, and BaO is 0.7 or lower.

17. The glass according to claim 9, wherein the total content of $SiO_2$ and $Al_2O_3$ is 79.0% or less.

18. The glass according to claim 9, having a liquidus temperature $T_L$ lower than 1300° C.

19. The glass according to claim 9, having a density less than 2.55 g/cm³.

20. The glass according to claim 9, having a specific modulus of 31 MNm/kg or higher.

21. The glass according to claim 9, having a temperature $T_2$ at which a viscosity η reaches $10^2$ poises (dPa·s) of lower than 1770° C.

22. The glass according to claim 9, having a temperature $T_4$ at which a viscosity η reaches $10^4$ poises (dPa·s) of lower than 1280° C.

23. The glass according to claim 9, having a thermal expansion coefficient of $10\times10^{-7}$/° C. or higher.

24. The glass according to claim 9, having a glass transition point $T_g$ higher than 680° C.

25. The glass according to claim 9, having an alkali resistance lower than 2 mg/cm² and an acid resistance lower than 0.1 mg/cm².

26. A glass comprising, in terms of mole percentage based on oxides,
60% or more of $SiO_2$,
4% or more and less than 15% of $Al_2O_3$,
0 to 5% of MgO,
1 to 12% of CaO,
0 to 7% of SrO,
0 to 5% of BaO,
0 to 10% of $TiO_2$,
0% or more and less than 4% of $Li_2O$
0% or more and less than 4% of $K_2O$,
3% to 12% of $Na_2O$,
0% or more and less than 0.01% of $B_2O_3$ and
0 to 5% of $ZrO_2$,
wherein:
a total content of $SiO_2$ and $Al_2O_3$ is 80.5% or less,
a molar ratio (MgO/RO) of MgO to a total content (RO) of MgO, CaO, SrO, and BaO is 0.7 or lower, and
contents of $SiO_2$, $Al_2O_3$, RO and $R_2O$ are such that a value obtained by the Formula (1) is 90 or more:

$$[SiO_2]+2\times[Al_2O_3]+0.8\times[RO]-0.5\times[R_2O] \quad \text{Formula (1)},$$

wherein in the Formula (1), RO represents a total content of MgO, CaO, SrO, and BaO, and $R_2O$ represents a total content of $Li_2O$, $Na_2O$ and $K_2O$.

27. The glass according to claim 26, wherein, in terms of mole percentage based on oxides, MgO is less than 5% and at least any one of (1) to (3) is satisfied:
(1) greater than 0% and 4% or less of $ZrO_2$ is contained;
(2) 7% or less of $Na_2O$ is contained; and
(3) 9% or less of $Na_2O$, 11% or less of $Al_2O_3$ and 1% or more and 9.5% or less of CaO are contained.

28. The glass according to claim 26, comprising 0 to 4% of MgO.

29. The glass according to claim 26, wherein, in terms of mole percentage based on oxides, MgO is 5% and at least one of (4) and (5) is satisfied:
(4) greater than 0% and 4% or less of $ZrO_2$ is contained; and
(5) 1% or more and 8.5% or less of CaO is contained.

30. The glass according to claim 26, comprising 4% to 12% of CaO.

31. The glass according to claim 26, comprising 7% to 12% of CaO.

32. The glass according to claim 26, wherein the total content of $SiO_2$ and $Al_2O_3$ is 79.0% or less.

* * * * *